Sept. 6, 1966   R. M. TUCK ETAL   3,270,586
TRANSMISSION
Original Filed Sept. 14, 1960   10 Sheets-Sheet 1
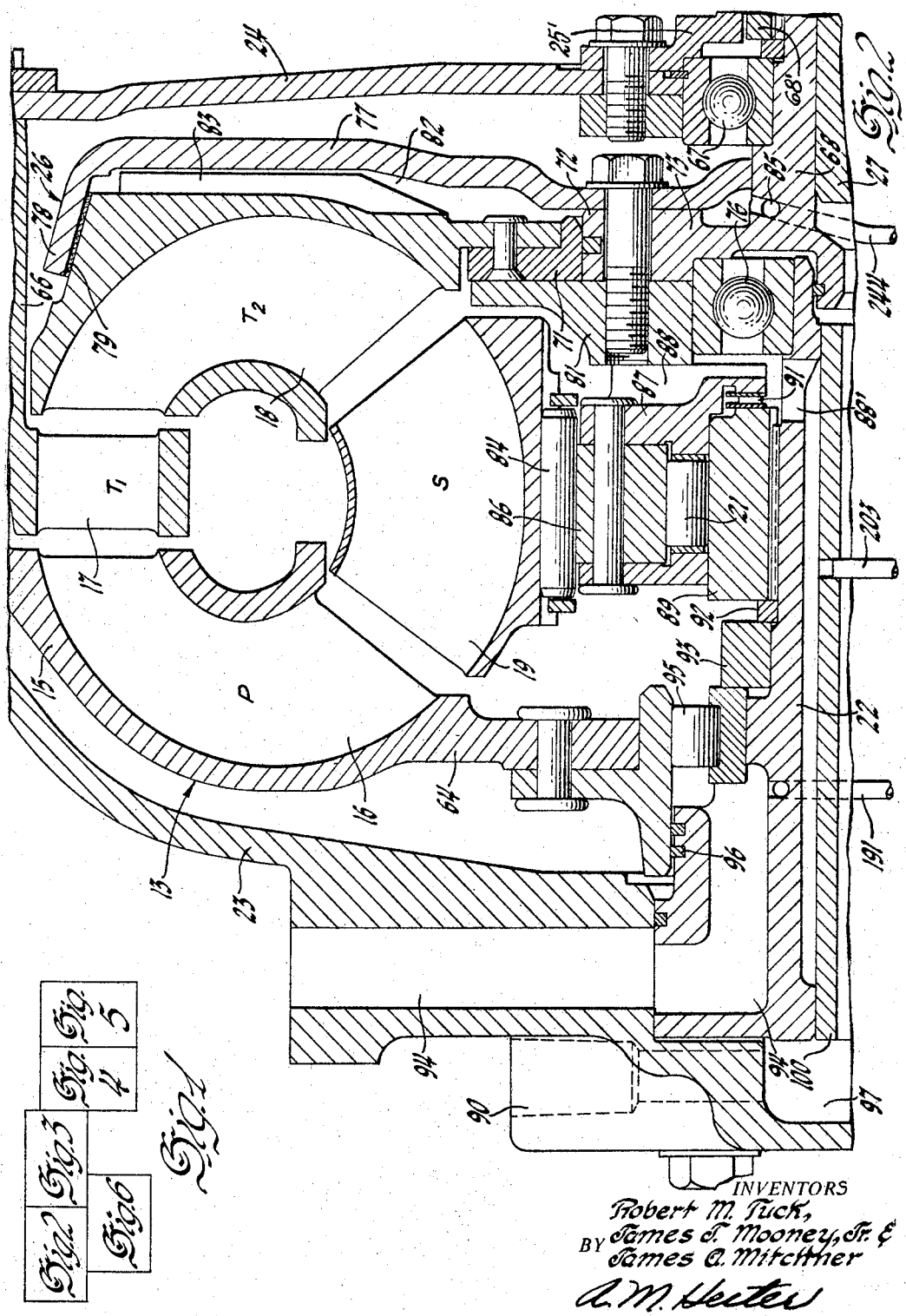
INVENTORS
Robert M. Tuck,
James T. Mooney, Jr. &
BY James C. Mitchner
A. M. Heiter
ATTORNEY

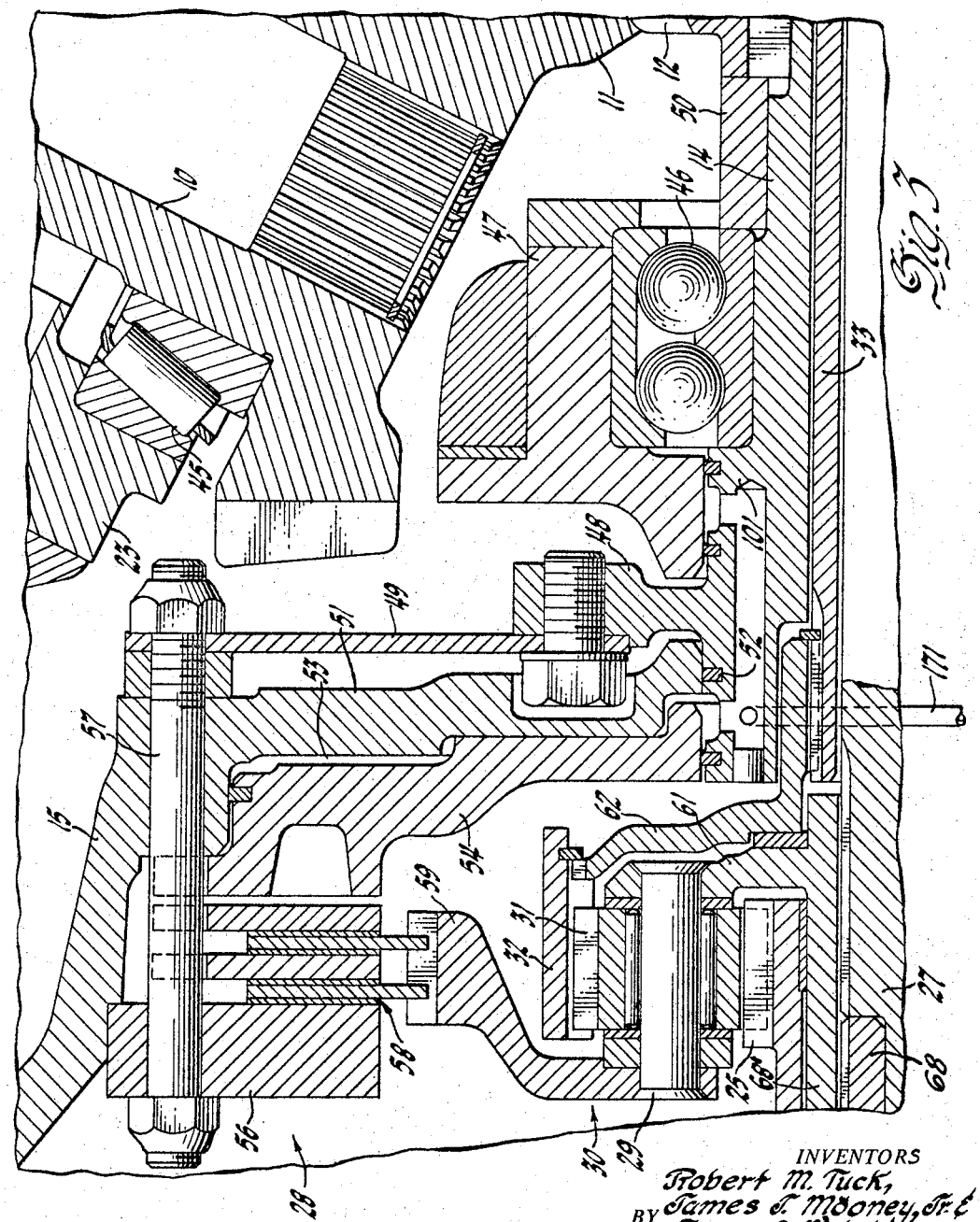

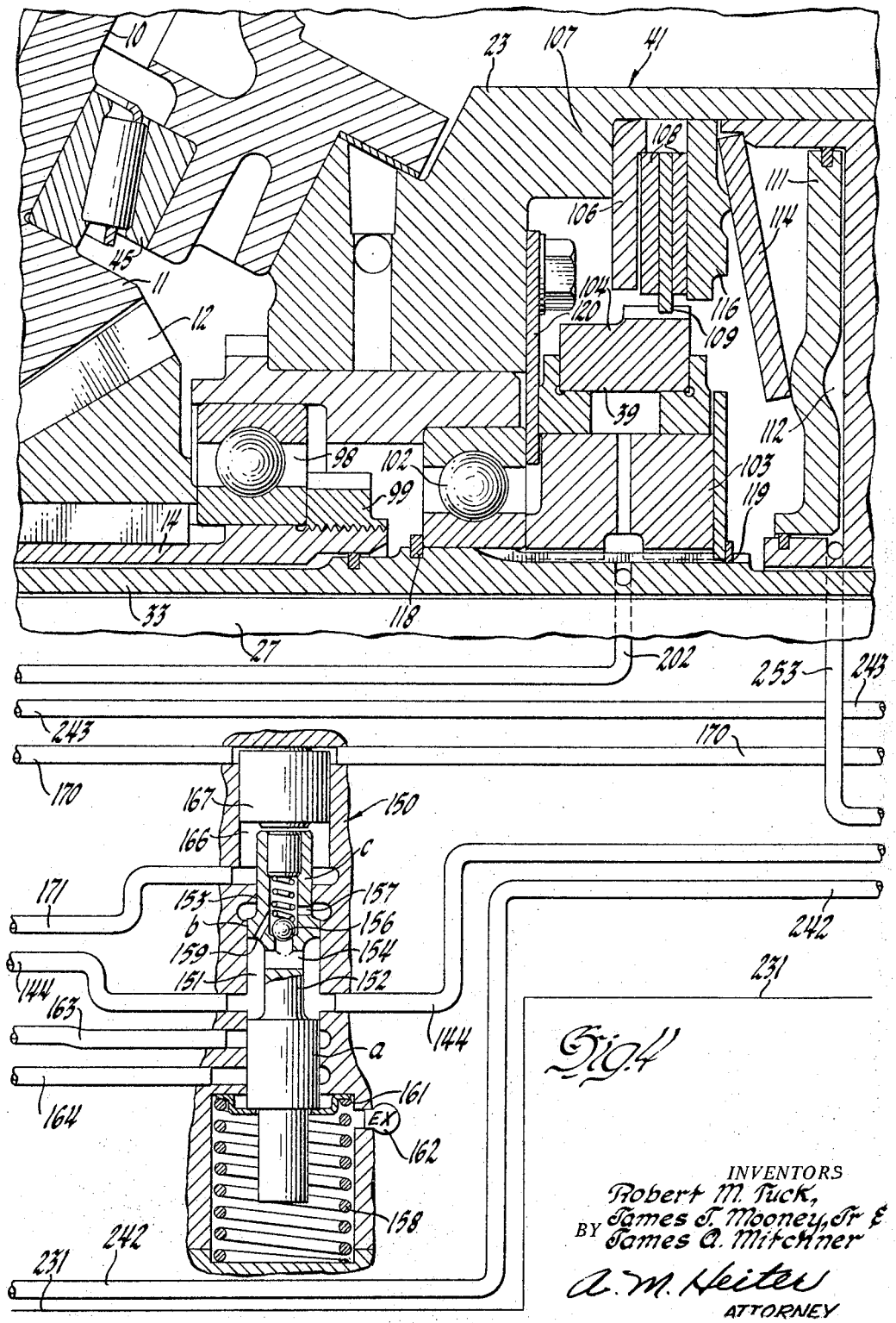

Sept. 6, 1966    R. M. TUCK ETAL    3,270,586
TRANSMISSION
Original Filed Sept. 14, 1960    10 Sheets-Sheet 4
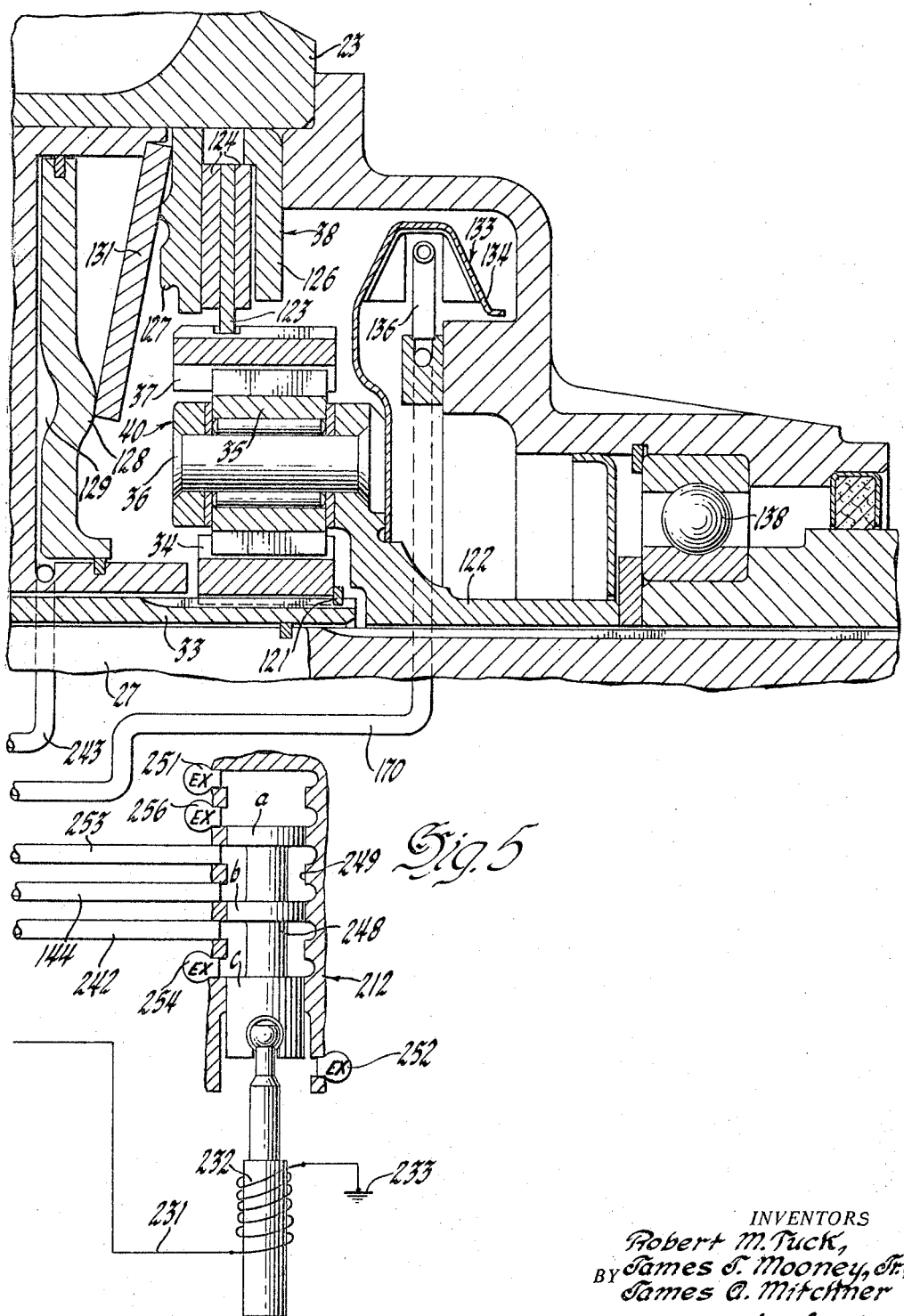
INVENTORS
Robert M. Tuck,
BY James T. Mooney, Jr.;
James O. Mitchner
A. M. Heiter
ATTORNEY

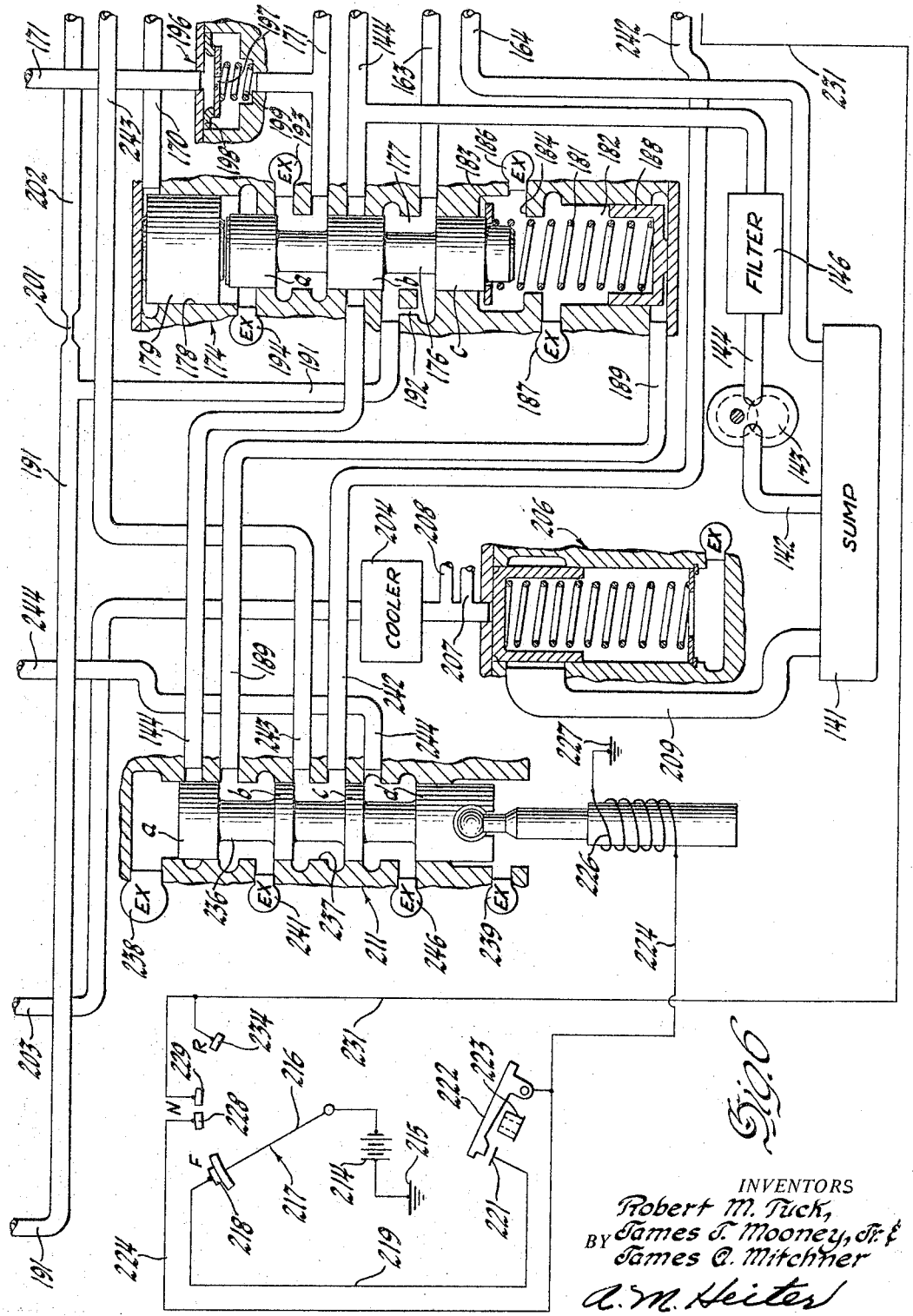

Sept. 6, 1966    R. M. TUCK ETAL    3,270,586
TRANSMISSION

Original Filed Sept. 14, 1960    10 Sheets-Sheet 6

INVENTORS
Robert M. Tuck,
BY James J. Mooney, Jr. &
James C. Mitchner

A. M. Heiter
ATTORNEY

INVENTORS
Robert M. Tuck,
James T. Mooney, Jr.
James O. Mitchner
BY A. M. Heiter
ATTORNEY

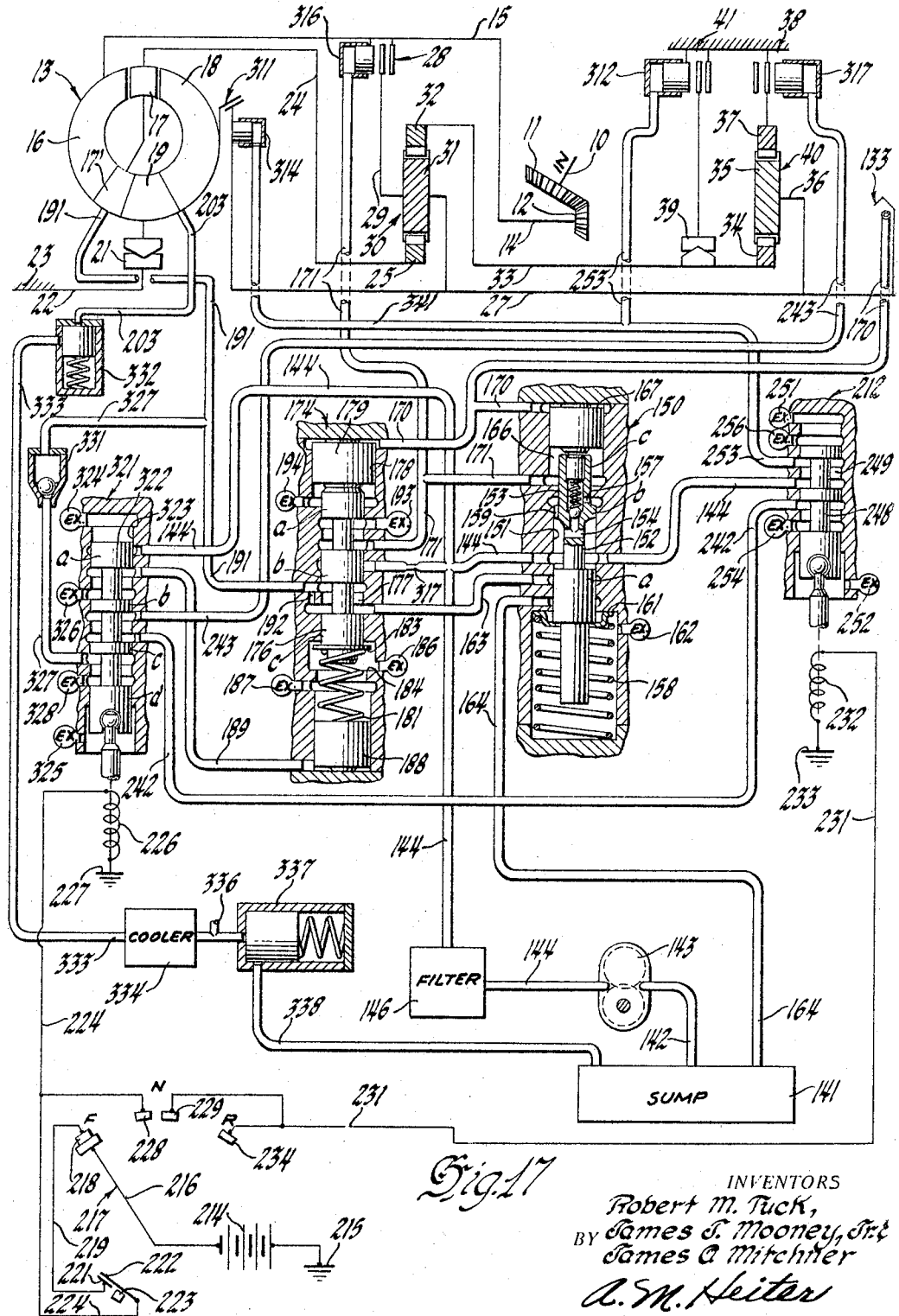

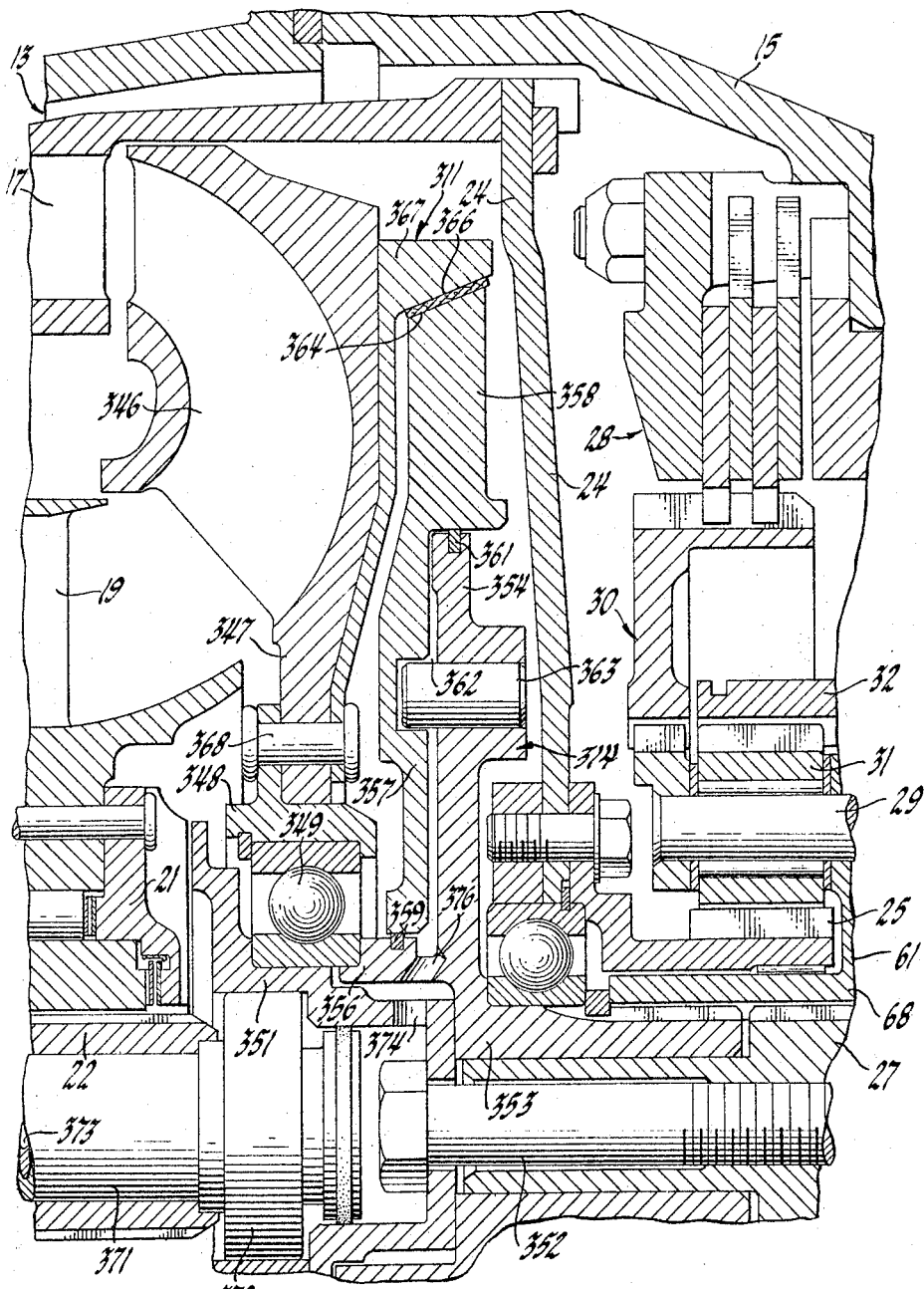

3,270,586
TRANSMISSION
Robert M. Tuck and James J. Mooney, Jr., Indianapolis, and James A. Mitchner, Martinsville, Ind., assignors to General Motors Corporation, Detroit, Mich., a corporation of Delaware
Continuation of application Ser. No. 55,895, Sept. 14, 1960. This application May 13, 1965, Ser. No. 455,441
70 Claims. (Cl. 74—677)

This invention relates to a transmission employing a torque converter and gearing and particularly to transmissions employing multi-phase torque converters and multi-ratio gearing and a control system therefor and is a continuation of the applicants' S.N. 55,895, now abandoned, filed September 14, 1960.

The transmission employs a multiple turbine torque converter, a planetary gear set combining the output of the turbines of the torque converter, a forward brake and reverse planetary gear set. The control system for this drive arrangement provides three manually selectable ranges of operation, forward, neutral and reverse. In forward drive, automatic variation of the torque output of the converter turbines provides these drive phases of operation, a first converter and gearing phase, a second converter and a coupling phase. Automatic and manual controls also provide a direct drive, or in a modification, a split torque drive.

In the preferred form of the invention an input angle drive located between the converter combining gear set and the forward one-way brake and reverse gear set is connected to drive the converter pump and the direct drive clutch. In a first phase of forward drive operation, the first turbine provides a maximum torque at stall which gradually diminishes with increasing speed ratio to zero about the middle of the speed ratio range while the second turbine provides low torque at stall and a gradually increasing torque with increasing speed ratio reaching a maximum when the torque of the first turbine reaches zero. The combining planetary gear set connects the first turbine to the output shaft in a torque multiplying ratio while the second turbine is directly connected. In a range of higher speed ratios the second turbine provides decreasing torque multiplication and remains directly connected to the output shaft to provide a lower torque multiplication drive in the second converter phase. In the third phase with the converter in coupling the second turbine directly drives the output shaft. In the fourth phase of the forward drive the direct drive clutch is engaged to provide a direct mechanical drive from the input to the output. For reverse, the ring gear of the reverse planetary gear set is held. Since only low speed ratios are employed in reverse, the first turbine rotates forwardly and provides all the drive. The freely rotating second turbine at these low reverse speeds does not interfere with the converter operation. The control system provides a positive neutral in which all clutches are released but is arranged so that on failure of the electrical control system forward drive will be engaged to permit engine drive.

A simplified control system employing a pressure regulator valve and three control valves permits manual selection of forward, positive neutral and reverse. The automatic speed responsive control in forward provides converter operation and direct drive with a manual overcontrol to vary the shift point to provide a forced downshift.

The connection between the second turbine and the drive train is provided by a cone clutch having conical friction surfaces formed as a part of the piston and cylinder walls at their outer perimeter. The piston and cylinder form an expansible motor chamber located within the pressurized torque converter operating chamber. High pressure fluid supplied to the motor chamber and flowing through the restriction provided by the conical friction surfaces to the converter chamber provides a higher pressure in the motor chamber to release the clutch. Conversely when fluid is exhausted from the motor chamber, pressure in the converter torus engages the cone surfaces of the motor to engage the clutch. Fins are provided in the motor chamber to expel residual fluid in order to expedite the cone clutch engagement. A plate clutch may also be used.

The gearing arrangement may be modified to provide split torque and to provide additional torque multiplication variations in the first and second turbine connections to the output shaft.

An object of the invention is to provide in a multiple turbine torque converter having a torque combining planetary gear set combining the torque of the multiple turbines and a forward and reverse drive establishing device to provide forward and reverse drive, a lockup clutch and a second turbine clutch, a control system employing a speed responsive lockup clutch control valve and a pair of control valves to provide a forward drive including first converter, second converter, and direct drive phases of operation, a positive neutral, and a reverse drive.

Another object of the invention is to provide in a multi-turbine transmission having a torque combining gear set and reverse gear set, an angle drive input located between the gear sets connected to drive the torque converter pump.

Another object of the invention is to provide in a transmission having a multiple turbine torque converter, a torque combining gear set and a forward reverse gear set, an angle drive connected to drive the torque converter and located between the torque converter and the gear sets.

Another object of the invention is to provide in a transmission having a multiple turbine torque converter a torque combining planetary gear set, a forward and reverse gear set, an improved structural arrangement of the gearing and control system.

Another object of the invention is to provide in a multi-turbine torque converter, a first turbine providing maximum torque at stall gradually diminishing to zero at a speed ratio in a middle range of speed ratios, a second turbine providing low torque at stall gradually increasing to a maximum at a speed ratio in a middle range of speed ratios and thereafter providing decreasing torque.

Another object of the invention is to provide in a transmission having a multi-turbine torque converter and torque multiplying and combining gearing, a first turbine providing maximum torque at stall gradually diminishing to zero at a speed ratio in a middle range of speed ratios, and a second turbine providing a low torque ratio at stall gradually increasing to a maximum at a speed ratio in a middle range of speed ratios and thereafter decreasing, and a lockup clutch to provide direct drive.

Another object of the invention is to provide in a transmission having a multi-turbine torque converter and torque multiplying and combining gearing, a first turbine providing maximum torque at stall gradually diminishing to zero at a speed ratio in a middle range of speed ratios, and a second turbine providing a low torque ratio at stall gradually increasing to a maximum at a speed ratio in a middle range of speed ratios and thereafter decreasing, and a lockup clutch to provide a split torque drive.

Another object of the invention is to provide in a transmission having a multi-turbine torque converter and torque multiplying and combining gearing, a first turbine providing maximum torque at stall gradually diminishing to zero, and a second turbine providing a low torque ratio at stall gradually increasing to a maximum and controls for the torque combining gearing to change the ratio between a turbine and the output.

Another object of the invention is to provide in a transmission having a multiple turbine torque converter a torque combining planetary gear set and a direct drive clutch arranged to provide a first converter phase providing high torque multiplication driving through a high torque multiplication gear ratio, a second converter phase providing lower torque multiplication driving through a lower torque multiplication gear ratio and a direct drive.

Another object of the invention is to provide a cone clutch located in a pressure chamber having an expansible chamber motor formed by the conical clutch elements and including a controlled opening between the conical friction surfaces.

These and other objects of the invention will be more apparent from the following drawings and specification of the preferred embodiments of the invention.

FIGURES 2–6, when arranged in accordance with the showing in FIGURE 1, form a diagrammatic showing of the structural features of the preferred embodiment of the transmission including the torque converter and gearing and the control system therefor.

FIGURE 7 diagrammatically shows the torque converter and gearing of the transmission shown in FIGURES 2–5.

FIGURE 8 diagrammaticallyy shows a modified transmission torque converter and gearing arrangement similar to FIGURE 7 but providing split torque drive.

FIGURE 9 shows another modified transmission having a converter and gearing arrangement in which the gearing is located to the rear of the input shaft.

FIGURE 17 is a diagrammatic view illustrating a modified transmission gearing and control system arrangement.

FIGURE 18 shows the details of the modified neutral clutch of FIGURE 17.

Figure 14:
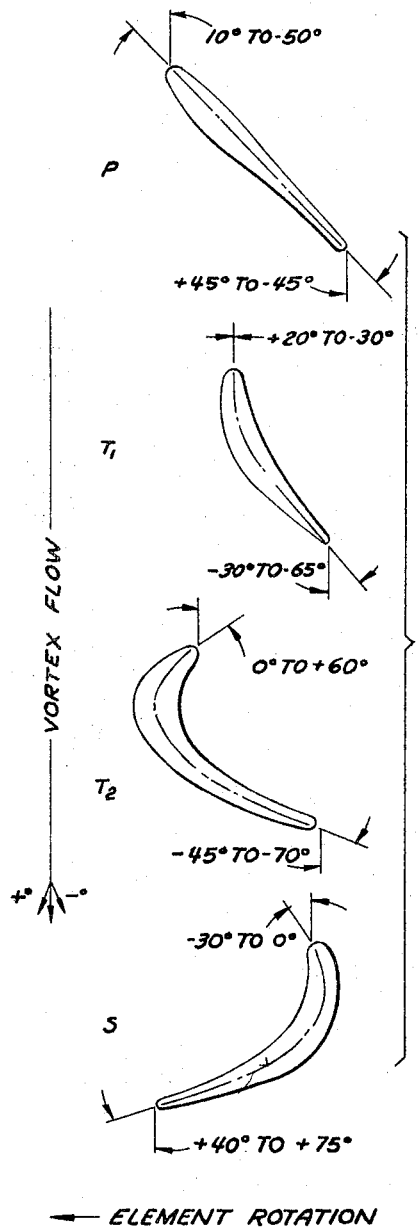
FIGURE 14 shows the preferred range of blade angles for the torque converter.
Figure 15:
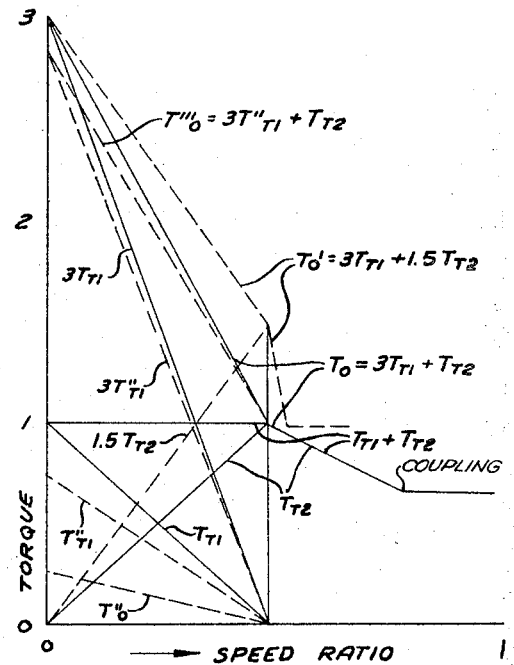
FIGURE 15 shows typical torque curves for the converters.

The preferred transmission drive arrangement illustrated in FIGURES 2–5 in structural form and in FIGURE 7 diagrammatically shows the combination of the torque converter 13 having dual turbines, a torque combining planetary gear set 30 and a forward one-way clutch 41 and a reverse gear set 40. The input shaft 10 is connected through a pair of bevel gears 11 and 12 to drive the sleeve shaft 14 which drives the rotary torque converter housing 15. The housing 15 drives the torque converter pump 16 which circulates the fluid around the torque converter torus sequentially to the first turbine 17, the second turbine 18 and the stator 19. The pump P, first and second turbines $T_1$ and $T_2$ and stator S have blading as shown in FIGURE 14 preferably having inlet and outlet angles selected in the ranges indicated to provide high torque multiplication at stall and improved torque multiplication throughout the torque multiplication range with high efficiency. To obtain other performance characteristics, though with some sacrifice of efficiency, the stator exit angle may vary from zero to 85°. The first turbine $T_1$ provides maximum torque at stall and a straight line reduction of torque to zero at about .5 speed ratio as shown in FIGURE 15, employing a torque combining gear set having about a 3:1 ratio of the carrier to the sun gear, i.e., a gear set having a 60-tooth ring gear and a 30-tooth sun gear. When the ratio is increased the torque of $T_1$ will be zero at a lower speed ratio and when decreased the torque of $T_1$ will be zero at a higher speed ratio. The ratio of the torque combining gear set is preferably 3:1 but may vary between 4:1 and 2:1. The torque of $T_2$ increases from near zero at stall on a curve inverse to the $T_1$ torque curve, FIGURE 15, and reaches a maximum at the same speed ratio that $T_1$ is zero and then gradually decreases to 1:1 torque ratio at coupling. The maximum torque of the first turbine $T_{T1}$ at stall and maximum torque of the second turbine $T_{T2}$ at the speed ratio that first turbine torque is zero is preferably the same to provide a straight line output torque curve. As shown in FIG. 15, the output torque $T_0$ with a combining gear set having a 3:1 ratio is $3T_{T1}+T_{T2}$. When the direct drive clutch 28 is engaged during the converter range of operation, the torque is transmitted directly from input shaft 10 to output shaft 27 and the torque converter does not transmit torque.

The stator 19 is connected by a one-way brake device 21 and a ground sleeve 22 to the stationary housing 23 of the transmission to prevent reverse rotation of the stator. The first turbine 17 is connected by a driving disc 24 to the sun gear 25 of the torque combining gear set 30. The second turbine 18 is connected by a second turbine or neutral clutch 26 to the output shaft 27. The direct drive clutch 28 connects the housing 15, which is driven by the input shaft 10, through the carrier 29 of the torque combining gear set to the output shaft 27. The carrier 29 has a plurality of planetary pinions 31 meshing with the sun gear 25 and a ring gear 32 which is connected by the reverse drive sleeve shaft 33 to the sun gear 34 of the reverse gear set 40. The reverse gear set has a carrier 36 fixed to the output shaft 27 and pinions 35 meshing with sun gear 34 and ring gear 37 which may be held by the reverse brake or ratio establishing device 38.

In forward drive the forward brake or drive establishing device 41 and the neutral clutch or drive establishing device 26 are both engaged. At low speed ratios the first turbine 17 provides high torque which gradually diminishes with increasing speed ratio to zero torque at an intermediate speed ratio. This first turbine torque is transmitted through the sun gear 25 of the torque combining gear set. Since the forward brake 41 is engaged and the one-way clutch 39 holds shaft 33 and ring gear 32 stationary, an additional gear reduction is provided by the torque combining gear set. The second turbine provides practically no torque at stall and increasing torque with increasing speed ratio to a maximum torque at the intermediate speed ratio and thereafter a reduced torque. The second turbine torque is transmitted through the neutral clutch 26 directly to the output shaft 27 and thus added to $T_1$ torque.

Direct drive is also provided by engaging the direct drive clutch 28 and connecting the input 10 through the bevel gearing 11–12, shaft 14 and housing 15 to the carrier 29 which is attached to the output shaft 27.

In reverse drive the forward brake is disengaged and the reverse brake 38 and neutral clutch 26 are engaged. Reverse is only employed to provide a drive at low speeds or low speed ratios and employs only the first turbine 17 drive connected to the sun gear 25. Since at stall the carrier 29 is stationary, the forward drive of sun gear 25 provides reverse rotation of the ring gear 32 and shaft 33, and thus sun gear 34 of the reverse gear set 40 is driven reversely. With the ring gear 37 held by brake 38, the carrier 36 and the output shaft 27 are driven reversely.

The arrangement of the drive train shown in FIGURES 2–5 inclusive structurally illustrates the preferred embodiment of the invention. The input shaft 10 is rotatably mounted and axially located by a pair of thrust bearings, one of which is shown at 45 fixed in the transmission housing 23 and drives bevel gear 11. The input bevel gear 12 meshing with gear 11 is splined to the input sleeve shaft 14 which is rotatably mounted by the thrust bearing 46 located in a transverse portion 47 of the housing 23. A spacing ring 50 is located between gear 12 and bearing 46. The shaft 14 has a drive hub 48 which is connected by a flexible driving disc 49 to drive the housing 15. The housing 15 has a rear end wall 51 slidably mounted on and sealed to the hub or shaft 14. The end wall 51 of housing 15 and the shaft 14 are formed to provide a cylinder 53 in which the annular piston 54 is reciprocally mounted. The disc 49 and the fixed abutment 56 for the clutch 28 are secured to the housing 15 by bolts 57. The plates 58 of clutch 28 are alternately splined by the bolt 57 to the housing 15 and to the outer portion 59 of the carrier 29. It will be seen that on the supply of fluid to the cylinder 53 that the piston 54 is moved to engage the direct drive clutch 28 connecting the input housing 15 through the carrier 29 which has a hub 61 formed on sleeve shaft 68' which is splined to the output shaft 27, and that on the exhaust of fluid from cylinder 53 the fluid under pressure in the torque converter housing moves the piston in the opposite direction to release clutch 28. The ring gear 32 is connected by a driving hub 62 to the connecting shaft 33.

The rotary torque converter housing 15 has a forward wall 64 and a rear wall 51 defining the torque converter operating chamber. The first turbine has a cylindrical extension 66 splined to the disc 24 which in turn is rotatably mounted by a bearing 67 on the sleeve shaft 68. The disc 24 is drivingly connected by sleeve 25' to the sun gear 25. The second turbine member 18 has an annular bearing shoe 71 rotatably and axially slidably mounted on and sealed to annular seat 72 of a hub 73 fixed to shaft 68 which is splined by sleeve shaft 68' to the output shaft 27 so shaft assembly 68, 68' and 27 transmit second turbine drive. The hub 73 is mounted by thrust bearing 76 on the ground sleeve 22. A fixed clutch member 77 is secured to the hub 73 and has at its outer end a cone friction clutch portion 78 cooperating with a cone friction clutch portion 79 formed on the second turbine member 18 which is movably mounted by the bearing 71 on seat 72 for movement between the member 77 and a stop member 81 also secured to the hub 73 for clutch engagement and disengagement.

The torque converter operating fluid in the torus portion of the torque converter normally urges a second turbine member 18 to move to the left or toward the center of the torus due to the centrifugal pressure effect. The torque converter housing is charged with operating fluid under pressure which, with the converter at rest exerts a balanced force on opposite sides of the second turbine. On rotation of the second turbine and the fluid on the bladed side, the centrifugal effect on the fluid reduces the pressure over a large part of the radius and increases the pressure near the perimeter. If the fluid on the other side is not rotated there is a large net force tending to move the second turbine to the left in FIGURE 2. Vanes 83 are provided on the right side to rotate the fluid in the motor chamber 82 to substantially balance these forces. To release the clutch 26, high pressure fluid is supplied to the motor chamber or cylinder 82 between member 77 and the second turbine 18 to move the second turbine 18 to the left against the lower pressure fluid in the torque converter housing to disengage the clutch surfaces 78–79. A sufficient supply of fluid to chamber 82 is provided so that the clutch surfaces 78–79 are maintained disengaged though oil flows through the restricted passage between friction surfaces 78 and 79. The high pressure actuating fluid supplied to motor chamber 82 flows through the restriction at the clutch friction surfaces to the torque converter housing which is maintained at a lower pressure. The restriction maintains a higher pressure in the motor chamber to keep the clutch disengaged. The thickness of the oil film passing between surfaces 78 and 79 must be at least several molecules thick to provide no appreciable drag. When it is desired to re-engage clutch 26, the control pressure in chamber 82 is vented. The fluid flows from the torque converter housing through the restriction to the vented motor chamber. Due to the pressure drop across the restriction, the pressure is lower in the motor chamber causing soft clutch engagement. After initial clutch drive engagement the pressure drops further for full engagement.

The stator 19 is connected by pins 84 to a hub 86 which has secured thereto a thrust portion 87 contacting part 81 of hub 73. The thrust portion 87 has passages 88 providing a portion of the converter outlet line. The inner race 89 of one-way brake 21 is splined to the ground sleeve 22. The stator 19 is located to limit movement to the right by the thrust portion 87 directly engaging part 81 which is fixed between bearings 67 and 76 and to limit movement to the left by the needle thrust bearing 91 which engages the inner race 89. The inner race 89 is located on the other side by rings 92 and 93. The pump hub 64 is rotatably mounted by a bearing 95 on the ground sleeve 22 and rotatably and axially located by bearing 46.

A converter inlet passage 94 may be provided in the transmission housing 23 and through the ground sleeve 22 and bearing 95 for the flow of converter supply fluid from line 191 to the torque converter operating chamber within the converter housing 15. Seals 96 between the hub 64 and the ground sleeve 22 will prevent fluid communication between the torque converter operating chamber and the transmission housing. The converter outlet line, diagrammatically shown by line 203, is provided by the radial passages 88 in thrust portion 87 of one-way brake 21, port 88' and the space between ground sleeve 22 and sleeve 100 to a port similar to port 94 but not shown. The clutch release line, diagrammatically shown by line 244, is provided by passage 85, the space within hub 68, the bore in sleeve 100, the cavity 97, and port or connection 90 in housing 23.

As shown in FIGURE 4, the rear portion of the input sleeve shaft 14 is rotatably mounted by a bearing 98 slidably supported on the housing 23. A ring 99 threaded on shaft 14 engages the end of bearing 98 and is tightened to locate the gear 12, spacer 50 and bearing 46 which is fixed to the housing against the shoulder 101 on the shaft 14. The connecting shaft 33 is supported by a bearing 102 fixed to the housing 23 and has splined thereto the inner race 103 of the one-way brake 39. The outer race 104 is controlled by the brake 41 which has a fixed abutment 106 resting against the shoulder 107 of the housing 23, a plurality of alternate plates 108 splined to the housing and intermediate plate 109 splined to the ring 104. This clutch is applied by a motor consisting of a piston 111 located in a cylinder 112 formed in the housing. The piston actuates the inner edge of an annular cantilever spring 114 pivoted at its outer edge on the housing and engaging at an intermediate ring fulcrum the presser plate 116 of clutch 41. Snap rings 118 and 119 axially locate bearing 102 and hub 103 on shaft 33. The washer 120 fits in an annular recess between the bearing 102 and the hub 103 to axially locate the assembly with respect to the housing 23.

Referring to FIGURE 5, the rear portion of the connecting shaft 33 is splined to the sun gear 34 axially located thereon by snap ring 121. The carrier 36 having planetary pinions 35 is connected by a hub 122 to the output shaft 27. The ring gear 37 is splined to a plate 123 of clutch 38 and located between the plates 124 which are splined to the housing. A fixed abutment 126 engages the shoulder on the housing while the pressure plate 127 is movably mounted on the other side of the plates. The clutch 38 is operated by a motor consisting of a piston 128 movably mounted in a cylinder 129 to engage the inner edge portion of an annular cantilever spring 131 which is pivoted at its outer edge and engages at an intermediate fulcrum ring point the pressure plate 127. A pitot governor 133 has an annular can 134 suitably secured to the hub 122 on the output shaft 27. The can provides an annular internal trough rotating toward the open end of the pitot tube 136 to provide a governor pressure proportional to output shaft speed. Fluid is supplied by suitable lines from the lubrication system to maintain the trough full of oil, the excess overflowing. The rear bearing 138 rotatably supports the output shaft 27 in the housing 23.

The lower portion of the transmission housing 23 has a suitable sump 141 shown diagrammatically in FIGURE 6 in which fluid is collected from all the exhausts in the system and supplies via inlet line 142 to the pump 143 preferably driven by the engine to the main line 144. A filter 146 may be provided in the main line.

The main line 144 is connected to the bore 151 of the pressure regulator valve 150 (FIGURE 4) including a valve element 152 having lands $a$ and $b$ of equal diameter located in the bore 151 and a land $c$ of smaller diameter located in the smaller bore 153. Fluid in the space between the lands $a$ and $b$ may enter the passage 154, go through the check valve 156 to passage 157 to act on the unbalanced area at the top of land $b$ to move the valve down against the biasing force of spring 158. The orifice 159 also connects the space between the lands $a$ and $b$ and the unbalanced area via passage 157 to provide a limited flow by-pass around check valved passage 154–157. The orifice delays the response of small pressure changes while the check valve 156 and passages 154–157 provides rapid response to large variations from the regulated pressure. The spring 158 engages a seat 161 seated against the lower end of land $a$. The spring chamber has an exhaust 162. With increasing pressure in the main line 144 the valve element 152 is moved downward and first exhaust fluid to the converter supply line 163 and then to an exhaust line 164 connected to sump. At the upper end of the valve in an enlarged bore portion 166, a plug 167 is reciprocally mounted to engage the end of the valve element 152. Governor pressure in line 170 is connected to the upper end of the bore 166 to act on the plug 167 to supplement the action of line pressure and thus reduce main line pressure in accordance with increasing governor pressure or output speed. The direct drive clutch line 171 is connected between the plug 167 and valve element 152 to reduce main line pressure when the direct drive clutch is engaged. Since the clutch pressure is greater than governor pressure the direct drive control line 171 will replace the governor effect of reducing main line pressure.

The direct shift valve 174 (FIG. 6) has a valve element 176 having lands $a$, $b$ and $c$ located in a bore 177. The land $a$ and the portion of the bore in which it operates is preferably slightly smaller than lands $b$ and $c$ to provide an unbalanced area acted on by fluid supplied to the direct clutch for hysteresis so that the upshift speed is higher than the downshift speed. The governor pressure supplied by line 170 is connected to the top end of the large bore 178 and acts on the plug 179 to urge the plug and valve 176 down to the upshift position against the biasing force of spring 181 located in a bore 182 providing a spring chamber. The spring 181 holds a seat washer 183 against the land $c$ of the valve element 176. The seat washer 183 engages the shoulder 184 to limit downward movement of the valve. Exhaust ports 186 and 187 prevent the accumulation of fluid in the spring chamber portion of bore 182. Spring 181 seats on a piston 188 reciprocally mounted in bore 182 which may be moved upwardly to engage shoulder 184 by a signal pressure supplied by line 189 to positively downshift the direct shift valve 174. In the downshift position shown land $b$ of valve element 176 blocks main line 144 and freely connects the converter supply line 163 to the converter feed line 191. The direct clutch line 171 is connected between lands $a$ and $b$ to exhaust 193. When the governor pressure upshifts valve 176 the main line 144 is connected to the direct clutch line 171 to engage the direct clutch 28. The free passage from converter supply line 163 to converter feed line 191 is blocked so that the flow must pass through orifice 192 providing a limited torque converter feed when the direct drive clutch is engaged. Exhaust 194 prevents the accumulation of fluid between the plug 179 and valve element 176.

The check valve 196 is closed during the supply of fluid to the direct drive clutch except for a small orifice 197 in the valve plate 198 which permits a slow or limited flow to control the speed of engagement of the direct drive clutch. The direct drive clutch releases quickly since the valve plate 198 opens against the spring 199 to provide full flow for quick disengagement. The converter feed line 191 is connected via an orifice 201 to a lubrication supply line 202. The converter outlet line 203 is connected through the cooler 204 to a pressure regulator valve 206 which provides limited exhaust pressure so that there is always a low minimum pressure for the gear lube line 207 and pitot tube supply line 208. Excess fluid from the pressure control valve 206 is connected by exhaust 209 to the sump 141.

The hydraulic drive controls include a first solenoid actuated shift valve 211, FIG. 6, and a second solenoid actuated shift valve 212, FIG. 5, both actuated by a manually operable electrical control system. The electrical control system FIG. 6 employs a source of electricity as battery 214 grounded at 215 which is connected to the movable blade 216 of a multiple switch 217. The switch 217 complete circuits as explained below to actuate the solenoid valves to supply the drive engaging devices in accordance with the following table.

| | Solenoid Number | | Neutral Clutch 26 | Forward Brake 41 | Reverse Brake 38 | Direct Dr. Clutch 28 |
|---|---|---|---|---|---|---|
| | 1 | 2 | | | | |
| Reverse | − | + | x | o | x | o |
| Neutral | + | − | o | o | o | o |
| Forward, Full Throttle to Detent—Low Speed | − | − | x | x | o | o |
| Forward Full Throttle to Detent—High Speed | − | − | x | x | o | x |
| Forward, Full Throttle through Detent—Low Speed | + | − | x | x | o | o |
| Forward, Full Throttle through Detent—High Speed | + | − | x | x | o | o |

+, Energized; −, Deenergized; x, Engaged; o, Disengaged.

Switch 217 in the forward position shown in FIG. 6 connects the battery via blade 216 to terminal 218 and line 219 to the throttle switch 221 which is opened in the normal drive range. Since no circuits are completed both solenoids are inactive or in the minus position shown. In the forward position of the manual control 216 when the throttle pedal 222 is moved through the detent 223 at or just beyond full throttle. The throttle switch 221 is closed completing a circuit via line 224 and solenoid 226 to ground 227 to actuate the first shift valve 211 to positively disengage direct drive as explained below.

When the manual control 216 is moved to the neutral position, blade 216 engages both contacts 228 and 229, since contact 228 is connected by line 224 to solenoid 226 and ground 227 and contact 229 is connected by line 231 to solenoid 232 and ground 233 to supply current, both solenoids are activated to place both shift valves in the plus position.

When the manual control or blade 216 is moved to the reverse position to contact the reverse terminal 234 a circuit is connected through line 231 to the second solenoid 232 to place the second shift valve 212 in the plus position. Since the circuit to the first shift valve valve is broken it is in the minus position.

The first shift valve 211 has a valve element 236 having lands *a*, *b*, *c* and *d* located in a bore 237. The ends of the bore 237 are in all valve positions connected to the exhaust 238 and 239. In the minus or unenergized position shown shift valve 211 blocks the main line 144 at land *a*. The signal line 189 is connected to exhaust 241 between lands *a* and *b*. The reverse apply line 242 which will supply main line pressure in a plus position of the second shift valve 212 is connected between lands *b* and *c* to the reverse brake line 243. The neutral or second turbine clutch release line 244 is connected between lands *c* and *d* to exhaust 246. In the plus or upper position of valve element 236 main line 144 is connected between the lands *a* and *b* to signal line 189. The reverse clutch line 243 is connected between lands *b* and *c* to exhaust 241. The reverse apply line 242 is connected between lands *c* and *d* to second turbine clutch line 244. Exhaust 246 is blocked by land *b*.

Referring to FIG. 5 the second shift valve 212 has a valve element 248 having lands *a*, *b* and *c* of equal diameter located in a bore 249. The ends of the bore are connected to exhaust by exhausts 251 and 252. In the minus position shown of this valve main line 144 is connected between lands *a* and *b* to the forward clutch line 253 and the reverse apply line 242 is connected between lands *d* and *c* to exhaust 254. In a plus position of this valve forward clutch line 253 is connected to exhaust 256 and main line 144 between lands *b* and *c* to reverse apply line 242 while land *c* blocks exhaust 254.

*Operation*

The control system controls the dual turbine torque converter and the planetary gear set gearing to provide three ranges of operation—forward, neutral and reverse. In forward three phases of operation are provided: a first phase in which the drive is provided mainly by the first turbine and a reduction gear unit; a second phase in which the drive is mainly provided by the second turbine directly connected to the output shaft and a direct drive locking up the torque converter.

When the engine is started the input driven pump 143 supplies fluid under pressure to the main line 144 which is regulated by the regulator valve 150, FIG. 4. The exhaust is first connected to the converter supply line 163 and thereafter to an exhaust line 164. With the manual control switch 217 in the neutral position lines 224 and 231 are energized to place both the first and second shift valves 211 and 212 in the energized or plus position. The vehicle is not moving and there is no governor pressure in line 170 so the direct shift valve 174 is in the downshift position shown connecting the converter supply line 163 through a full flow passage to the converter feed line 191 to quickly supply a high volume of fluid to the torque converter operating chamber. The second turbine clutch 26 is released by pressure supplied from the main line 144 through the second shift valve 212 to the reverse apply line 242 and through the first shift valve 211 to the second turbine release line 244 to release clutch 26 and positively disengage the second turbine to provide a positive neutral. When the clutch 26 is released the second turbine 18 will rotate freely and thus the second turbine will provide no torque and the first turbine will operate normally. The direct drive clutch 28 is released since the line 171 is connected by the direct shift valve 174 to exhaust 193. The forward brake 41 is released since the forward brake line 253 is connected by the second shift valve 212 to exhaust 256. The reverse brake 38 is released since the reverse line 243 is connected by the first shift valve 211 to exhaust 241.

When the manually controlled switch 217 is moved to the forward position and the throttle pedal 222 is operating in the range from zero throttle to the detent position, both the lines 224 and 231 are disconnected and both the shift valves 211 and 212 return to the deenergized or minus position shown. The second turbine clutch 26 is engaged since the line 244 is connected by the first shift valve 211 to exhaust 246 permitting the pressure in the torque converter operating chamber to move the second turbine member 18 into engagement with the clutch member 77. The forward brake 41 is engaged since the main line 144 is connected by the second shift valve 212 to line 253. The reverse brake 38 is disengaged since line 243 is connected by the first shift valve 211 to the reverse apply line 242 which is exhausted through the second shift valve 212 to exhaust 254. The main line 144 is blocked and the signal line 189 connected to exhaust 241 at the first shift valve 211 permitting normal operation of the direct shift valve 174 under influence of governor pressure and the spring biasing force. At a certain speed when the torque multiplication provided by the torque converter operating in its first and second phases is no longer required or at coupling, the governor pressure supplied by line 170 acts on the plug 179 to overcome the opposing force of spring 181 to upshift the valve element 176 to connect the main line 144 to the direct clutch line 171. The flow in line 171 passes slowly through the orifice 197 of valve 196 to provide slow gradual and smooth engagement of the direct drive clutch 28. At the same time the converter supply line 163 which had previously been connected to the converter feed line 191 is connected through the orifice 192 to provide a reduced volume of flow to the converter and thus reduce the converter supply pressure. On a reduction in speed and consequently a reduction of governor pressure in line 170 the spring returns the shift valve element 176 to the upshift position shown reconnecting the clutch line 171 to exhaust 193 to disengage the direct drive clutch. This disengagement will occur rapidly since the valve 196 opens to permit full flow during disengagement. It should be noted that the direct drive clutch line 171 is also connected to the bore 166 of the pressure regulator valve 150 to act on the end of valve element 152 disabling the action of governor pressure and providing a reduction in main line pressure to a predetermined degree in direct drive.

When the throttle pedal 222 is moved through the detent position switch 221 is engaged to energize solenoid 226 moving the first shift valve 211 to the plus position. This will connect the main line 144 to the signal line 189 which actuates the abutment piston 188 to positively downshift valve 176 to connect line 171 to exhaust 193 disengaging direct drive clutch 28 to provide the torque multiplication or converter drive. Reverse remains disengaged since the line 243 is connected to exhaust 241. The second turbine clutch 26 remains engaged since the line 244 previously connected by valve 211 to exhaust 246 is connected to reverse supply line 242 which is connected to the second shift valve to exhaust 254.

In reverse the control switch 217 is moved to the reverse position to contact 234 to energize the line 231 moving the second shift valve 212 to the plus position, the first shift valve 211 being in the minus position shown. The forward brake 41 is released since line 253 is connected by the second shift valve 212 to exhaust 256. The main line 144 is connected by the second shift valve 212 to the reverse apply line 242 and through the first shift valve 211 to the reverse line 243 to engage the reverse brake 38. The neutral or second turbine clutch 26 remains engaged since line 244 is connected to exhaust 246. Though the second turbine 18 will rotate backwardly with the output shaft 27 at the low speeds encountered in reverse, it will not interfere with reverse drive. At the low speeds employed in reverse the first turbine 17 provides maximum output torque and through the reduction gearing and reverse drive of the reduction and reverse planetary gear sets drives the output shaft at a lower ratio than in forward drive.

Modifications

The drive arrangement described above employing a dual turbine torque converter, a first turbine output planetary reduction gear set and a reverse planetary gear set as pointed out above is diagrammatically shown in FIG. 7 and the torque curves shown in FIG. 15. As pointed out above this construction provides when direct drive clutch 28 is engaged, a mechanical one to one drive from the input shaft 10 to the output shaft 27. The modified arrangement shown in FIGURE 8 provides the same forward and reverse drive except that the direct drive is improved to provide a split torque drive in which part of the torque is transmitted through the torque converter and part directly through a mechanical drive. The input shaft 10 and drive connections, the torque converter 13, the first turbine drive through the planetary reduction gear set 30, the second turbine drive through the clutch 26 to the output shaft 27, the forward brake 41, one-way clutch device 39, and the reverse planetary gear set 40 are arranged in FIGURE 8 in the same manner as in FIGURE 7. However, the direct drive clutch 28 is eliminated and a split torque clutch 261 is employed to connect the input drive from input housing 15 to the ring gear 32 of the planetary gear unit 30 as shown in FIGURE 8.

Figure 16:
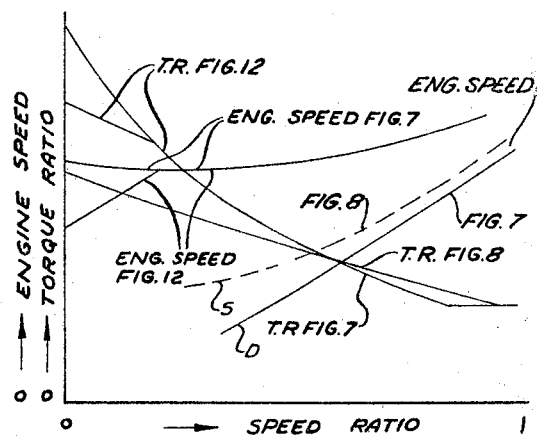
FIGURE 16 shows typical engine speed and torque ratio curves for the converters.

This transmission may be controlled in the same manner as the transmission shown in FIGURE 7 to provide forward, neutral and reverse drives, and in forward range a first and second converter phase as shown by the curves $T_{T1}$, $T_{T2}$ and $T_0$ in FIGURE 15. However, instead of a direct drive phase, engagement of the clutch 261 provides a split torque drive phase in which torque is transmitted directly from the input shaft 10 through clutch 261 mechanically to the ring gear 32 and torque is transmitted from the input shaft 10 through the torque converter 13 by the first turbine 17 to sun gear 25 and by the second turbine 18 directly to the output shaft 27. The input torque split depends on the blade angles of the torque converter and the ratio of the gear set. The torque split with a 3:1 ratio planetary gear set will be 66% mechanical and 34% hydraulic. A typical engine speed curve D, FIGURE 16, is shown for the direct drive provided by the FIGURE 7 transmission. The FIGURE 8 transmission in split torque drive will provide an engine speed curve S, FIGURE 16, permitting engagement of split torque drive at lower speed ratios without objectional engine lugging.

Though the modification shown in FIGURE 8 operates like the FIGURE 7 transmission in the torque converter ranges, the split torque modification of FIGURE 8 provides increased engine speed and torque ratio as compared to the converter direct drive phase of FIGURE 7 to provide improved efficiency since part of the torque is transmitted by a direct drive. The split torque drive provides increased engine speed particularly at medium speed ratios as compared to the FIGURE 7 transmission direct drive.

FIGURE 9 is similar to FIGURE 7 except that the reduction planetary gear set 30 is located to the rear of the input shaft in order to locate the gear units in one consolidated group. The input shaft 10 is connected in the same way as in FIGURE 7 to the torque converter unit 13. The same type of torque converter 13 is employed having a first turbine connected to the gear unit 30 and a second turbine connected to the output shaft 27 by clutch 26. In the connection from the first turbine to the sun gear 25 in addition to the hub member 24 an additional sleeve shaft 263 is employed between the output shaft 27 and the input shaft 14 to connect the disc 24 to the sun gear 25 located to the rear of the input shaft 10. The input shaft 14 is also connected by a hub 264 located to the rear of the input shaft 10 to drive the direct drive clutch 28 which drives the carrier 29 of the planetary gear set 30 in the same manner as in FIGURE 7. The above controls for FIGURE 7 may also be used to control the FIGURE 9 transmission arrangement which reduces the required length of the portion of output shaft 27 carrying full torque and consolidates the gearing for improved rigidity.

Figure 10:
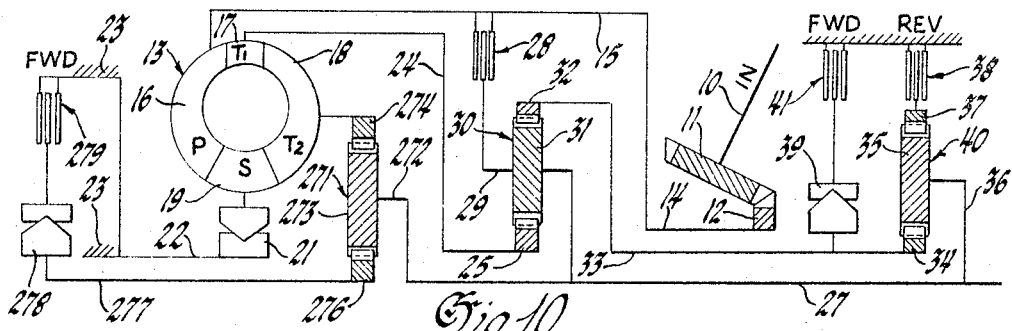
FIGURE 10 shows another torque converter transmission having a modified gear arrangement providing a reduction drive in the second turbine drive train.

In the modification shown in FIGURE 10 in addition to the drive features shown of the modification, FIGURE 7, the second turbine 18 is also connected to the output shaft by a reduction gear set 271. In FIGURE 10 the input shaft 10 is connected by gear set 11–12 to an input shaft 14 which drives the input housing 15. Thus, the input shaft 10 directly drives the pump 16 of the torque converter 13. This torque converter also has a first turbine 17 and a second turbine 18, which function in the same manner as the above turbines, and a stator 19 connected through a one-way brake device 21 to the ground sleeve 22. The first turbine is connected by a hub 24 to the sun gear 25 of the planetary reduction gear 30. This reduction gear has a carrier 29 connected to the output shaft 27 and having pinions 31 meshing with sun gear 25 and a ring gear 32. The input housing 15 is connected by the direct drive 28 to the carrier 29 and output shaft 27. The ring gear 32 is connected by sleeve shaft assembly 33 so that the ring gear may be held against reverse rotation by one-way brake 39 when the forward brake 41 is applied. The sleeve shaft also drives a sun gear 34 of the reverse planetary gear set 40. The reverse gear set has a carrier 36 fixed to the output shaft 27 having planetary pinions 35 meshing with sun gear 34 and ring gear 37 which may be held by the reverse brake 38. This structure is similar to the first preferred form of the invention diagrammatically illustrated in FIGURE 7. In addition, in FIGURE 10, a reduction drive providing, for example, a 1.5 to 1 ratio between the second turbine 18 and the output shaft 27 is provided. The second turbine reduction gear set 271 has a carrier 272 fixed to the output shaft 27 having planetary pinions 273 meshing with a ring gear 274 fixed to the second turbine 18 and a sun gear 276 fixed to the control shaft 277. The control shaft 277 is connected by a one-way clutch device 278 which will prevent reverse rotation of sun gear 276 when the second turbine brake 279 is applied, but permit forward rotation at all times.

The drive arrangement shown in FIGURE 10 may be controlled by the same hydraulic control system disclosed above in FIGURES 2–6 when the clutch or brake 279 is biased by fluid or spring forces to the engaged position and released by fluid pressure which may be supplied by the second turbine clutch line 244 or directly engaged by forward clutch line 253. In forward drive the brake 41 is engaged and the brake 279 is engaged. Then in the first phase of forward operation which occurs at low speed ratios the first turbine 17 will drive through the reduction gear set 30, the ring gear 32 being held by the one-way device 39 and the brake 41 to drive the output shaft 27 at a reduced speed compared to the speed of the first turbine. When the torque converter operates in the second phase at higher speed ratios, the second turbine 18 provides a substantial portion of the drive. The second turbine being connected to ring gear 274 will drive through reduction gear set 271. Since the sun gear 276 is held against reverse rotation by the one-way device 278 and the auxiliary forward brake 279 the second turbine will drive the output shaft 27 at a reduction gear ratio. A third phase is provided when the torque converter 13 is in coupling and the second turbine gear set 271 provides a reduction drive or passing gear. In the fourth phase generally occurring during coupling the direct drive clutch 28 is engaged to provide a direct mechanical connection between the input shaft 10 and the output shaft 27. During direct drive one-way clutch 278 breaks away permitting forward rotation of shaft 277. In neutral all clutches and brakes are released to provide a positive neutral. In reverse the reverse brake 38 is engaged, the main forward brake 41 and the direct drive clutch 28 are disengaged and the auxiliary forward brake 279 may be engaged or disengaged. This provides a first turbine drive to provide reverse the same way described above with regard to FIGURE 7.

During converter operation the FIGURE 10 construction will provide a first turbine torque curve $T_{T1}$ which provides as multiplied by gear set 30 $3T_{T1}$ and a second turbine torque curve $T_{T2}$ which provides as multiplied by gear set 271 curve $1.5T_{T2}$. The summation of these curves provides the output torque curve for the FIGURE 10 construction $T_0'=3T_{T1}+1.5T_{T2}$. It will be seen that this construction provides a much higher torque multiplication in the middle speed ratio range than conventional three element converters and a higher torque multiplication in the middle ranges than the FIGURE 7 construction.

FIGURE 10 may be modified to provide split torque the same way that FIGURE 7 is modified as shown in FIGURE 8 by connecting the clutch 28 between the housing 15 and the ring gear 32 to provide a split torque drive instead of the direct drive phase.

Figure 11:
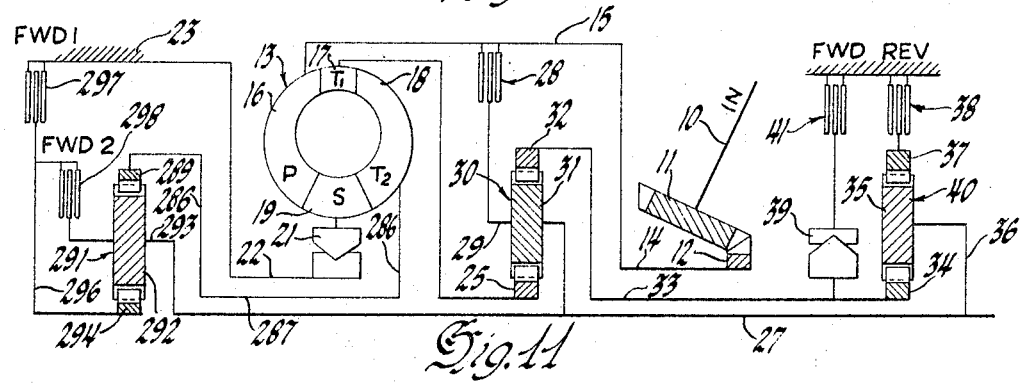
FIGURE 11 shows another torque converter transmission having a modified gearing arrangement providing a reduction drive and a direct drive in the second turbine gear train.

FIG. 11 is an additional modification particularly of FIG. 10 illustrating a transmission having an additional second turbine drive phase. The parts similar to FIG. 7 have the same reference numerals. The input shaft 10 drives through the bevel gears 11–12 and input shaft 14, the input housing 15. The torque converter 13 has a pump 16 driven by the input housing 15, a first turbine 17, a second turbine 18, and a stator 19 as in FIG. 7. The first turbine 17 drives the sun gear 25 of the reduction gear 30 at a reduced ratio to drive the output shaft 27 and carrier 29 at a reduced ratio when the ring gear 32 is held against reverse rotation by the shaft 33, one-way device 39 and forward brake 41. The reverse planetary gear set 40 has a sun gear 34 fixed to shaft 33, a ring gear 37, which may be held by the reverse brake 38, and an output carrier 36 connected to output shaft 27. The direct drive clutch 28 may connect the input housing 15 through carrier 29 to the output shaft 27. It will be seen that this portion of the gearing arrangement is the same as FIG. 7. In the modified portion the second turbine 18 is connected by a hub 286, a shaft 287, to the ring gear 289 of the second turbine planetary gear set 291. The gear set 291 has a plurality of planetary pinions 292 mounted on a carrier 293 which mesh with the ring gear 289 and a sun gear 294. The sun gear 294 is connected to a control hub 296 which may be held stationary by the auxiliary forward brake 297 (FWD1) which is connected to the housing 23 to provide a reduction drive from the second turbine 18 to the output shaft 27 or may be locked up by the auxiliary forward clutch 298 (FWD2) to provide a direct drive between the second turbine and the output shaft 27.

This torque converter and gearing arrangement may be controlled by the control system described above in connection with FIGS. 2–6. The forward clutch 41, the reverse clutch 38 and the direct drive clutch 28 being the same will be controlled in the same way. The auxiliary brake 297 and the auxiliary forward clutch 298 may be controlled by the second turbine clutch line 244. Both the brake 297 and the clutch 298 may be spring applied and released by pressure supplied by line 244 and selectively admitted to either the clutch 298 or brake 297 under the control of an additional manual valve. When clutch 28 is engaged brake 297 must be released. The control pressure in line 171 which engages the direct clutch 28 must act on the manual valve to insure that it is not in the position to allow brake 297 to be engaged. The forward clutch line 253 pressure may be connected selectively by a valve to apply either clutch 298 or brake 297 with an overcontrol to insure application of clutch and release of brake 297 when clutch 28 is engaged. The drive system and control system of FIGURE 11 will provide neutral and reverse drives in the same manner as pointed out above in connection with FIGURES 7 and 10. Basically the FIGURE 11 transmission will operate when in forward and brake 297 is engaged like the FIGURE 10 transmission described above and when in forward and the clutch 298 is engaged like the FIGURE 7 transmission described above. In the first phase of forward drive the first turbine 17 will drive the output shaft through the reduction gear unit 30. In the second phase the second turbine will drive through the reduction of gear unit 291, when the brake 297 is engaged and clutch 298 released, to operate like the FIGURE 10 transmission. In a third phase the second turbine 18 when the torque converter 13 is operating in the coupling phase and the brake 297 is engaged will provide a passing gear. In a fourth phase when the clutch 298 is engaged and the brake 297 released the second turbine will have a direct drive connection to the output shaft as in the FIGURE 7 transmission. In a fifth phase with the converter in coupling and the clutch 298 engaged directly connecting the second turbine to the output shaft, the transmission will provide coupling as in the FIGURE 7 transmission. In the sixth phase the direct drive clutch 28 is engaged to provide a direct mechanical drive from the input shaft 10 to the output shaft 27 as in FIG. 7 above. The drive arrangement of FIG. 11 may be modified to substitute for the direct drive clutch 28 a split torque drive similar to the split torque clutch 261 of FIG. 8 to connect the input housing 15 to the ring gear 32.

Figure 12:
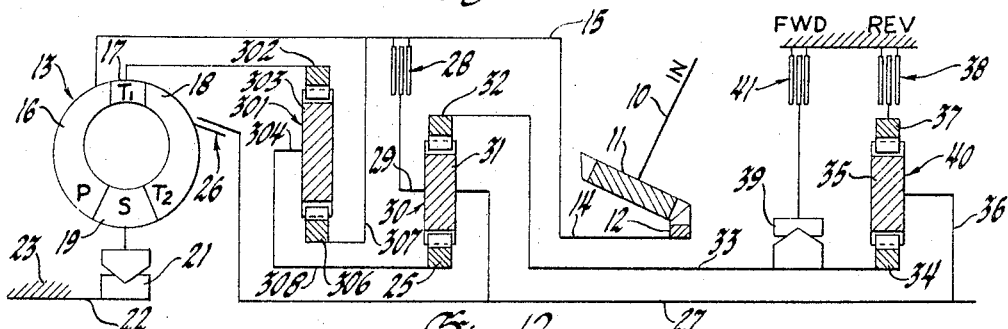
FIGURE 12 shows another torque converter transmission having a modified gearing arrangement providing a spplit torque drive in the first turbine gear train.

FIG. 12 is a modification of FIG. 7 in which a split torque gear set 301 has been placed between the first turbine 17 and the reduction gear set 30. As in FIG. 7 the drive arrangement of FIG. 12 has an input shaft 10 connected through bevel gears 11, 12 and input shaft 14 to the input housing 15. Torque converter 13 has a pump 16 driven by the input housing 15, a first turbine 17 and a second turbine 18 and a one-way stator 19. The first turbine 17, instead of being directly connected to the input sun gear 25 of the planetary reduction gear 30 as in FIG. 7, is in FIG. 12 connected through the split torque gear set 301. The first turbine 17 drives the ring gear 302 which meshes with planetary pinions 303 mounted on the carrier 304. Pinions 303 mesh with a sun gear 306 fixed by a hub 307 to the input housing 15. The output carrier 304 is connected by a shaft 308 to the input sun gear 25 and provides a split torque drive having a proportion of first turbine fluid drive and a lesser proportion of mechanical input drive in the same proportion as the diameter of the ring gear 302 and the sun gear 306. This split torque drive from the first turbine 17 is transmitted at a reduced ratio by the gear set 30 to the output shaft 27 when the ring gear 32 is held by the one-way device 39 and forward brake 41. The direct drive clutch 28 and the reverse and neutral drives operate in the same manner as in FIGURE 7. This drive arrangement having the same clutches 26 and 28 and brakes 41 and 38 as in FIGURES 7 may be operated by the control system shown in FIGURES 2–6. This arrangement provides the same phases of operation as provided in FIGURE 7 except that the firts phase with the first turbine driving as a split torque drive with about ⅓ of the torque provided directly by the engine and ⅔ provided by the engine driving through the torque converter. This has the advantage of providing a high capacity converter providing a low stall speed in the converter operation to reduce noise during the high torque multiplication drive usually encountered when a vehicle starts to move. This reducing of engine speed is illustrated by the engine speed curve for this type of transmission FIGURE 16—Eng. Speed FIGURE 12. This is accomplished without sacrificing much torque ratio at stall as indicated by the TR FIGURE 12 curve in FIGURE 16 due to the fact that as shown in FIGURE 15 both the $T''_{T1}$ curve showing first turbine torque and the $T''_0$ curve showing the direct mechanical drive of the FIGURE 12 transmission are maximum at stall and both are multiplied by 3 to get the $3T''_{T1}$ curve which provides almost as much torque as the $3T_{T1}$ curve for the FIG. 7 transmission. Since the $T_{T2}$ curves for the FIG. 7 and FIG. 12 transmission are substantially the same, $T'''_0 = 3T'' + T_{T2}$ for FIG. 12 will be less at stall than $T_0$ for FIG. 7.

Figure 13:
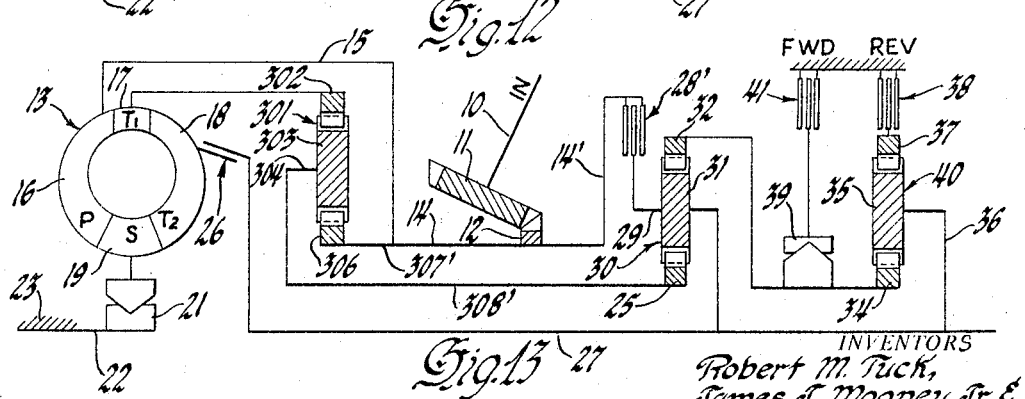
FIGURE 13 shows another torque converter transmission having gearing providing a split torque drive in the first turbine drive train and a modified lockup clutch arrangement.

FIG. 13 is a modification of FIG. 12 with the reduction gear set relocated to the rear of the input shaft 10. This drive arrangement provides the same drives and the same drive phases in forward drive as described above in connection with the FIG. 12 transmission. The direct drive clutch 28' is driven directly from a rearward extension 14' of the input shaft 14 and thus connects the input shaft 10 directly to the carrier 29 of the reduction gear set 30. Sleeve shaft 308' is similar to the shaft 308 but extended in order to connected the output carrier 304 located forwardly of the input shaft to the sun gear 25 of planetary gear set 30 located rearwardly of the input shaft 10. The drive for this sun gear 306 instead of being provided by a hub 307 may be provided by extention 307' of the shaft 14. This arrangement of the gear units provides a transmission unit that is better balanced about the center location of the input shaft, a better balanced input sleeve shaft and simpler to construct and assemble.

A modified transmission and control system similar to the transmission diagrammatically illustrated in FIGURE 7 and shown in detail with the hydraulic control system in FIGURES 2–6 inclusive is illustrated in FIGURE 17. In the modified transmission of FIGURE 17 like reference numerals have been employed to indicate the same or very similar parts to simplify the description. This transmission employs a pressure applied neutral clutch 311 in place of the pressure released neutral clutch 26 of FIGURE 7. In addition the converter supply has been modified. This requires certain changes in the control system as explained below.

Referring to FIGURE 17 the input shaft 10, through the bevel gears 11–12, the sleeve shaft 14, the input housing 15, drives the pump 16 of the torque converter 13. The first turbine 17 and the second turbine 18 have the same torque characteristics as the first and second turbines described in connection with FIGURE 7. A third turbine 17' is fixed to rotate with the first turbine 17. The stator 19 is connected by the one-way clutch 21 and ground sleeve 22 to the transmission housing 23. The first turbine 17 is connected by the driving disc 24 to the sun gear 25 of the reducing planetary gear set 30 which has a carrier 29 connected to the output shaft 27 and planetary pinions 31 meshing with sun gear 25 and a ring gear 32. The direct drive or lockup clutch 28 connects the input drive housing 15 to the carrier 29 to provide direct drive. The ring gear 32 is similarly connected by sleeve shaft 33 to the one-way brake 39 which prevents reverse rotation when the forward brake 41 is engaged and to the sun gear 34 of the reverse planetary gear set 40. The reverse planetary gear set 40 has a carrier 36 connected to the output shaft 27 and having pinions 35 meshing with the sun gear 34 and the ring gear 37 which may be held by the reverse brake 38. The forward clutch 41 is engaged by the forward motor 312 when fluid is supplied to the forward motor to hold the outer race of one-way clutch 39 to prevent reverse rotation of sleeve shaft 33 and ring gear 32 so that the forward drive of first turbine 17 through sun gear 25 acts through the reducing gear set 30 to provide a reduction drive through carrier 29 to the output shaft 27. The neutral clutch 311 is engaged by neutral motor 314 when fluid is supplied to the neutral motor to connect second turbine 18 directly to the output shaft 27. The lockup or direct drive clutch 28 is engaged by motor 316 when fluid is supplied to this motor to provide direct drive from the input shaft 10 to the output shaft 27 through the carrier 29 and gear set 30. The direct drive motor 316 and neutral clutch motor 314 are both retracted by the fluid pressure in the torque converter operating chamber when exhausted. This converter arrangement operates in the same phases and provides the same torque characteristics as explained in connection with the above FIG. 7 transmission and shown by the curves in FIG. 15. When fluid is supplied to the reverse motor 317 to engage the reverse brake 38 the ring gear 37 is held and the first turbine drive through the gear set 30 drives the sleeve shaft 33 and sun gear 34 reversely as in the FIG. 7 transmission to drive the output shaft 27 in reverse.

The hydraulic control system has a sump 141 located in the base of the fixed transmission housing 23 which supplies fluid via a similar inlet line to pump 143. The pump supplies fluid to the main line 144 which may have a filter 146 and has a regulator valve 150 regulating the pressure in the main line 144. The regulator valve 150 is the same as the regulator valve 150 shown in FIG. 4 and described above except that the orifice 159 is provided by a clearance between the land $b$ and the bore 151 instead of a hole in land $b$. The governor pressure supplied by pitot governor 133 to line 170 may be connected to the end of bore 166 to act on plug 167 to reduce the regulated main line pressure with increasing vehicle speed as pointed out above.

The direct shift valve 174 is the same as the direct shift valve 174 shown in FIG. 6 and described above. This valve normally blocks the main line 144 and connects the converter supply line 163 without restriction to the converter feeder inlet line 191. When the speed of the vehicle reaches the desired speed in which a shift to direct drive is to be made the governor pressure in line 170 acting on plug 179 overcomes spring 181 and moves the valve down to connect the main line through orifice 317 to the direct drive clutch line 171 to supply fluid under pressure to the direct motor 316 to engage the direct drive clutch 28. At the same time the full flow connection to the converter feed line 191 is blocked requiring flow from the converter supply line 163 to flow through orifice 192 to converter feed line 191. The orifice 317 is placed in the branch of main line 144, feeding the direct shift valve 174, so that on an upshift to direct drive the surge of fluid to motor 316 will not reduce main pressure line pressure and interfere with the proper supply of fluid to the forward and neutral clutches and converter. The direct drive shift valve 174 is also subject to a forced downshift when pressure is supplied to the signal line 189 as explained above in connection with the shift valve 174 of FIGURE 6.

The second shift valve 212 is the same as the second shift valve 212 illustrated in FIGURE 5. In the de-energized or minus position shown this valve connects main line 144 to the forward and neutral clutch lines 253–341 and connects the reverse neutral apply line 242 to exhaust 254. In the energized or plus position line 253 is connected to exhaust 256 while the main line is connected to the reverse neutral apply line 242.

The shift valve 321 shown in FIG. 17 is modified to provide the modified control of the neutral clutch 311 and the torque converter. The first shift valve 321 has a valve element 322 actuated by a solenoid 226 which like the solenoids 226 (FIG. 6) and 232 (FIGS. 5 and 17) on energization moves the valve from the minus position is shown to the plus position and has the usual spring incorporated in the solenoid to, on de-energization return the valve from the plus position to the minus position. The valve element 322 has lands $a$, $b$, $c$ and $d$ of equal diameter located in a bore 323. The upper and lower ends of the bore 323 are provided with exhausts 324 and 325 to insure free valve movement. With valve 322 in the minus position shown, the main line 144 is connected to bore 323 so that it is blocked, the signal line 189 is connected between lands $a$ and $b$ to exhaust 326, the reverse line 243 is connected between lands $b$ and $c$ to the reverse neutral apply line 242, and the converter feed branch 327 is connected to exhaust 328 between lands $c$ and $d$. When the valve 321 is energized and moved to the plus position main line 144 is connected between lands $a$ and $b$ to the signal line 189, the reverse line 243 is connected to exhaust 326, and the branch 327 of the converter feed line 191 is connected to the reverse neutral apply line 242.

The converter feed supplied by line 191 is supplemented by fluid supplied when the second shift valve 212 is in the plus position by the reverse neutral apply line 242 when the first shift valve 321 is in the plus position through the branch 327 of the converter feed line 191. The check valve 331 in this line permits flow of fluid from the reverse neutral apply line 242 through line 327 to the converter feed line 191 to increase the supply of fluid to the chamber of converter 13 in neutral to insure disengagement of clutches 28 and 311. Flow is blocked by check valve 331 in the branch 327 from line 191 to the shift valve 321. The torque converter outlet 203 is connected to a pressure regulator valve 332 having a piston located in a bore and biased to a closed position by a spring to regulate the pressure in the converter outlet line 203 to a moderate value to maintain the required converter pressure. The exhaust from the converter pressure regulator valve 332 is conducted via line 333 which may have a cooler 334 to the lubrication line 336 which supplies lubrication to the transmission gearing and fluid to the pitot governor 133. A low pressure is maintained in the lubrication line 336 by the low pressure regulator valve 337 which also consists of a suitable piston located in a bore and biased to the closed position by a spring. Excess pressure in line 336 will move the piston to exhaust excess fluid via exhaust line 338 to sump 141.

The electrical control system for the solenoid operated shift valves shown in FIG. 17 is the same as that shown in FIG. 6 and described above. Like reference numerals have been used to simplify the description. The manual control is shown in the forward position F where, since the circuit from battery 214 is broken at the throttle switch 221, does not energize either solenoid 226 or 232 and both the first and second shift valve are in the lower or minus position. With the manual control in the forward position, when the accelerator 222 is moved to the detent position, switch 221 is engaged connecting the battery to line 224 to energize solenoid 226 to move shift valve 321 in the plus position, the shift valve 212 remaining in the minus position. The manually controlled switch blade 216, when in the neutral-position, engages both contacts 228 and 229 to energize, through the lines 224 and 231, both solenoids and both valves are in the plus position. When the switch 216 is moved in reverse position engaging contact 234 only the solenoid 232 is energized placing the second shift valve 212 in the plus position, the first shift valve 321 remaining in the minus position.

When the vehicle is operating with the manual control 216 in the forward position shown and both shift valves are in the minus position shown in FIG. 17. The fluid supplied by the main line 144 is regulated as pointed out above by the regulator valve 150 which also supplies fluid for the converter via line 163. The direct shift valve being in the downshifted position shown connects the converter supply 163 to the converter feed line 191 without restriction to quickly fill and pressurize the converter chamber at an intermediate pressure controlled by regulator valve 332. The main line 144 is blocked by land $a$ of first shift valve 321 and is connected by the second shift valve 212 to the forward and neutral clutch line 253 which supplies fluid to motor 312 to engage the forward brake 41 and via the branch line 341 to engage the motor 314 to engage the neutral clutch 311. The converter is now in condition for operation in the torque converter phases of operation as explained above in connection with FIG. 7 and the curves of FIG. 15. The direct clutch motor 316 is connected by line 171, direct shift valve 174, to exhaust 193. The reverse motor 317 is connected by line 243 and valve 321 to the reverse neutral apply line 242 which is connected by the second shift valve 212 to exhaust 254. The branch converter supply line 327 is connected to exhaust 328 but the converter feed line 191 is not connected to this exhaust since the branch line 327 is blocked by the check valve 331. The signal line 189 is connected to exhaust 326 at the first shift valve 321.

When the vehicle speed reaches the desired shift point, a predetermined speed, i.e. 850 output shaft r.p.m., the governor pressure upshifts the shift valve 176 to connect the main line 144 to the direct drive line 171 to supply fluid to the motor 316 to engage the lockup clutch 28, the other connections remaining the same. A reduction of output shaft speed to approximately 720 r.p.m. is required, due to the hysteresis provided by the unbalanced area of lands $a$ and $b$, to downshift, connecting line 171 to exhaust 193 to permit the converter pressure in the converter chamber to retract the motor to disengage clutch 28.

When the throttle 222 is moved through detent position closing switch 221 to move the shift valve 321 to the plus position the main line 144 is connected by signal line 189 to act on the plug 188 to move it to engage the shoulder 184 to increase the biasing force of spring 181 on the direct shift valve 176. The transmission will then be downshifted, unless the output shaft r.p.m. is above, i.e. 1200 r.p.m., in which event no downshift will occur. When the transmission is operating with the valve 174 in the downshift position and thus in the converter phase with the direct clutch 28 disengaged, when the transmission reaches an output shaft speed of i.e. 1370 r.p.m., the shift valve 174 will automatically upshift to engage the lockup clutch 28. When the shift valve 321 is upshifted to the plus position, the connection of the reverse line 243 to exhaust via line 242, valve 212 to exhaust 254 is merely changed to exhaust 326 at the first valve 321 and the branch line 327 is changed from exhaust 328 to exhaust via reverse neutral apply line 242 and the second shift valve 212 to exhaust 254.

When the manual control 216 is moved to the neutral position both shift valves are shifted to the plus position. Main line 144 is connected by the first shift valve 321 to the signal line 189 to increase the biasing force on the direct shift valve 174 preventing engagement of direct drive unless the vehicle is moving rapidly. The reverse line 243 is connected by valve 321 to exhaust 326 and branch 327 is connected to reverse neutral apply line 242 which is connected at second shift valve 212 to main line 144. Thus, the main line supplies via the second shift valve 212, reverse neutral apply line 242, first shift valve 321, branch line 327, and through check valve 331 to converter feed line 191, main line regulated pressure to the torque converter in neutral to provide sufficiently high converter pressure to insure disengagement of the converter pressure disengaged neutral clutch 311 and the direct clutch 28. The forward and neutral clutch line 253 is connected by the second shift valve 212 to exhaust 256 so that no actuating or engaging pressure is supplied to neutral clutch 311 or forward brake 41. The lockup clutch line 171 is conected at the direct shift valve 174 to exhaust 193. Thus, the drive is positively disengaged.

When the manual control 216 is moved to the reverse position, shift valve 212 is moved to the plus position and shift valve 321 is in the minus position. The main line is connected at the second shift valve 212 to the reverse neutral apply line 242 which in turn is connected by first shift valve 321 to the reverse line 243 to actuate motor 317 to engage reverse brake 38. The forward brake 41 and the neutral clutch 311 are disengaged, since forward line 253 and its branch 341 to the neutral clutch motor 314 is connected at second shift valve 212 to exhaust 256. The lockup valve 174, since no governor pressure is supplied, remains in the downshift position connecting lockup clutch line 171 to exhaust 193.

The structural details of the neutral clutch 311 are shown in FIG. 18. The remainder of this transmission may be constructed as shown in detail in FIGS. 2, 3, 4 and 5 or diagrammatically in FIG. 7 and reference numerals similar to these figures are employed for clarity where there is no substantial change in structure. The modified second turbine 346 has similar blading and a hub portion 347 secured by pin 368 to a bearing seat 348 fixed to the bearing 349 to rotatably mount the second turbine on an extension portion 351 of the output shaft 27. Splines on sleeve shaft portion 68 of carrier 29 drivingly connect hub 353 and carrier 29 to output shaft 27. A bolt 352 axially secures the extension portion 351 and a hub portion 353 to the output shaft 27. The hub 353 has an annular plate portion 354 and a cylindrical extension 356 forming a partial cylinder for cooperation with the piston 357 formed as a part of the clutch driven member 358. The partial cylinder 354 and piston 357 have inner and outer seals 359 and 361 defining the expansible chamber 362 of the motor 314. One or more pins 363 fit in suitable bores in the piston and cylinder to prevent relative rotation thereof. The clutch member 358 has a cone clutch surface 364 cooperating with the cone clutch surface 366 on the clutch driving member 367. The clutch driving member is suitably secured by the fastener 368 to the second turbine 346.

Fluid is supplied to engage the clutch 311 through, as shown in FIG. 2, a fluid connection 90 to a cavity 97 in the forward portion of the housing to a sleeve 100. In FIG. 18 the modification of sleeve 100, sleeve 371, is modified at the right end to locate and support a bearing assembly 372 which rotatably supports the hub 351 and thus the forward end of the output shaft 27. Sleeve 371 also has a through bore 373 to supply fluid through the bearing 372 to the space within member 351 and through ports 374 and 376 to the expansible chamber 362. The fluid pressure in the torque converter operating chamber is connected between the second turbine hub 347 and stator 19 through bearing 349 to the space between the driven clutch member 358 and the driving clutch member 367 to act on the piston portion 357 coextensive with cylinder 354 to provide the retraction force for the clutch 311. The pressure on the portion of the driven clutch member located radially beyond cylinder 354 is balanced.

The above described embodiments of the invention are illustrative of the manner in which the invention may be employed and modified as indicated by the scope of the appended claims.

We claim:

1. In a transmission; a stationary housing; input means; output means; a torque converter having a pump driven by said input means, a first turbine, a second turbine and a stator; means connecting said stator to said housing to limit rotation in one direction to provide a reaction; a reduction and a reverse planetary gear set each having a carrier member with planetary pinions meshing with a sun gear member and a ring gear member; first drive connecting means for drive connecting said first turbine to said sun gear member of said reduction gear set; second drive connecting means for drive connecting said second turbine to said output means; both of said carrier members being connected to said output means; drive connection means between said ring gear member of said reduction gear set and said sun gear member of said reverse gear set; brake means to prevent reverse rotation of said ring gear member of said reduction gear set engaged for forward drive; reverse brake means for holding said ring gear member of said reverse gear set for reverse drive; and a drive clutch directly connecting said input means to one of said members of said reduction gear set.

2. The invention defined in claim 1 and said drive clutch connecting said input means to said carrier member of said reduction gear set.

3. The invention defined in claim 1 and said drive clutch connecting said input element to said ring gear member of said reduction gear set.

4. The invention defined in claim 1 and said second means for connecting including a clutch.

5. The invention defined in claim 1 and said second drive connecting means for connecting including a gear unit engageable to provide a modifying torque ratio in said second means for connecting.

6. The invention defined in claim 1 and said second drive connecting means for connecting being a gear unit providing a low and a high ratio selectively engageable to provide a low and a high torque ratio drive in said second means for connecting.

7. The invention defined in claim 1 and said first drive connecting means for connecting including a gear unit also connected to said input means providing a split torque drive to transmit part first turbine torque and part input torque to said sun gear.

8. In a transmission; input means; output means, a torque converter having a pump, a first turbine, a second turbine, and a stator and having blading so constructed and arranged that said first turbine provides high torque at stall and said torque decreasing with increasing speed, and said second turbine providing increasing torque over a low range of speed ratios and a decreasing torque over a higher range of speed ratios; said input means being connected to drive said pump, a planetary gear set having a carrier member having planetary pinions meshing with a ring gear member and a sleeve sun gear member; first drive connecting means drive connecting said first turbine to drive a first member of said gear set; brake means operably connected to a second member of said gear set to provide a reaction for said gear set; second drive connecting means having first drive transmitting means connecting a third member of said gear set directly to said output means to provide a direct drive connection between said third member and said output means and second drive transmitting means in addition to said first drive transmitting means drive connected to said output means and extending through said sleeve sun gear to bypass all members of said gear set and said first drive transmitting means and being directly connected to said second turbine to provide a drive connection from said second turbine bypassing all members of said gear set and directly connected to said output means.

9. The invention defined in claim 8 and said first drive connecting means including a torque modifying gear unit.

10. The invention defined in claim 8 and said second drive transmitting means including a torque modifying gear unit.

11. The invention defined in claim 8 and said second drive transmitting means including a gear unit providing a plurality of ratio drives.

12. The invention defined in claim 8 and drive clutch means connecting said input means to one of said second and third members of said gear set to drive said output element.

13. The invention defined in claim 8 and said second drive transmitting means of said second connecting means drive connecting said second turbine to said output element including clutch means connecting said second turbine to said output element.

14. The invention defined in claim 8 and a reverse planetary gear set having a carrier member having planetary pinions meshing with a ring gear member and a sleeve sun gear member mounted concentrically about said output means, a first member of said reverse gear set being connected to said second member of said forward gear set, a reverse brake connected to a second member of said reverse gear set to provide reaction for reverse drive, and a third member of said reverse gear set being connected to said output means.

15. The invention defined in claim 8 and said first member of said gear set being said sun gear member, said second member of said gear set being said ring gear member and said third member of said gear set being said carrier member.

16. The invention defined in claim 15 and said second drive transmitting means of said second drive connecting means including a torque modifying gear unit for modifying the torque transmitted from said second turbine to said output element.

17. The invention defined in claim 15 and said second drive transmitting means of said second drive connecting means drive connecting said second turbine to said output element including a gear unit selectively providing a high and a low ratio drive.

18. The invention defined in claim 15 and said first drive connecting means including a torque modifying gear unit.

19. In a transmission; input means, output means, a torque converter having a pump, first turbine, second turbine, and stator grounded to provide a reaction and having blading so constructed and arranged that said first turbine provides high torque at stall and said torque decreasing with increasing speed ratio, and said second turbine providing increasing torque over a low range of speed ratios and a decreasing torque in a higher range of speed ratios; said input means being connected to said pump; a planetary gear set having a carrier member having planetary pinions meshing with a ring gear member and a sun gear member; first drive connecting means drive connecting said first turbine to a first member of said gear set; brake means operably connected to a second member of said gear set to hold said second member to provide a reaction for said gear set; drive means connecting a third member of said gear set to said output means; second drive connecting means drive connecting said second turbine in shunt relation directly to said output means; and one of said drive connecting means including a second gear set for modifying the torque transmitted by said one of said connecting means.

20. The invention defined in claim 19 and said second gear set being in said first drive connecting means and also connected to said input element to provide a split torque drive delivering part first turbine torque and part input torque to said first member of said gear set.

21. The invention defined in claim 19 and said second gear set being in said second drive connecting means and providing a torque modifying gear drive to modify second turbine torque transmitted to the output element.

22. The invention defined in claim 19 and said second gear set being in said second drive connecting means and selectively providing a high ratio drive and a low ratio drive from said second turbine to said output element to transmit second turbine torque at a high or low ratio to the output element.

23. In a torque converter; an input element; an output element; a rotatable housing driven by said input element; means to supply operating fluid to said housing; drive means located within said housing including a pump driven by said input element, a turbine hydraulically driven by said pump, a clutch connecting said turbine to said output element including first clutch means on said turbine and second clutch means drivingly connected to said output element, said first and second clutch means being formed and located adjacent each other to provide a clutch operating expansible chamber motor between said first and second clutch means, friction clutch surfaces on said first and second clutch means adjacent the outer perimeter operative to close said operating chamber when the clutch surfaces are engaged and to open said clutch chamber when the clutch surfaces are disengaged, one of said clutch means being axially movable to engage and disengage said clutch, means to supply fluid under pressure to said expansible chamber motor to disengage said clutch, and to discontinue the supply of fluid to said clutch chamber for engagement of said clutch by the operating fluid in said rotatable housing, pump means on one of said clutch means to exhaust fluid at the outer periphery between said friction surfaces when the supply of fluid to said clutch operating chamber is discontinued to aid engagement of said clutch.

24. In a transmission; an input element; an output element; a clutch connecting said input element to said output element including first clutch means drivingly connected to said input element, and second clutch means drivingly connected to said output element, said first and second clutch means being formed and located adjacent each other to provide a clutch operating expansible chamber motor having a chamber between said first and second clutch means, friction clutch surfaces on said first and second clutch means adjacent the outer perimeter operative to close said chamber when the clutch is engaged and to open said chamber when the clutch is disengaged, one of said clutch means being axially movable to engage and disengage said clutch, biasing means normally acting on said first and second clutch means to bias said means to engage said clutch, means to supply fluid under pressure to said chamber to move one of said first and second clutch means to disengage said clutch, and to discontinue the supply of fluid to said chamber for engagement of said clutch by said biasing means, pump means on one of said clutch means to exhaust fluid at the outer periphery between said friction surfaces when the supply of fluid to said clutch operating chamber is discontinued to aid engagement of said clutch.

25. The invention defined in claim 24 and said pump means consisting of vanes mounted on one of said clutch means and located in said chamber.

26. In a transmission; an input element and a coaxial output element; a clutch connecting said input element to said output element including first clutch means drivingly connected to said input element, and second clutch means drivingly connected to said output element, said first and second clutch means being coaxially located and formed and located adjacent each other to provide a circular clutch operating expansible chamber motor having a chamber between said first and second clutch means coaxially located with respect to said elements, annular friction clutch surfaces on said first and second clutch means adjacent the outer perimeter of said chamber operative to close said chamber when the clutch is engaged and to open said chamber when the clutch is disengaged, one of said clutch means being axially movable to engage and disengage said clutch, biasing means normally acting on said first and second clutch means to bias said means to engage said clutch, means to supply fluid under pressure to said chamber to move one of said first and second clutch means to disengage said clutch, and to discontinue the supply of fluid to said clutch chamber for engagement of said clutch by said biasing means, pump means to exhaust fluid at the outer periphery between said friction surfaces when the supply of fluid to said clutch operating chamber is discontinued to aid engagement of said clutch.

27. The invention defined in claim 26 and said pump means consisting of centrifugal pumping vanes mounted on and driven by one of said clutch means and located in said chamber.

28. In a torque converter; an input element; an output element; a rotatable housing driven by said input element; means to supply operating fluid to said housing and to maintain fluid under pressure in said housing; drive means located within said housing including a pump driven by said input element to supply an axially moving stream of fluid, a turbine urged to move axially in one direction and rotated by said axially moving stream of fluid, a clutch connecting said turbine to said output element including first clutch means on said turbine and second clutch means drivingly connected to said output element, said first and second clutch means being formed and located adjacent each other to provide a clutch operating expansible chamber motor having a chamber between said first and second clutch means located coaxially of said turbine, annular friction clutch surfaces on said first and second clutch means adjacent the outer perimeter operative to close said operating chamber when the clutch is engaged and to open said clutch chamber when the clutch is disengaged to permit limited exhaust from said chamber between said surfaces, said turbine and said first clutch means being axially movably mounted with respect to said second clutch means in said one direction to engage said clutch and axially movable in the opposite direction to disengage said clutch, means to supply fluid under a higher pressure to said expansible chamber motor to disengage said clutch and replace fluid lost through said limited exhaust, and to discontinue the supply of fluid to said clutch chamber for engagement of said clutch by the axially moving stream of fluid received by said turbine, pump means on one of said clutch means to exhaust fluid at the outer periphery between said friction surfaces when the supply of fluid to said clutch operating chamber is discontinued to aid engagement of said clutch.

29. The invention defined in claim 28 and said pump means consisting of centrifugal pump vanes mounted on one of said clutch means and located in said chamber.

30. In a torque converter; an input element; an output element, a rotatable housing driven by said input element; means to supply operating fluid to said housing and to maintain fluid under pressure in said housing; drive means located within said housing including a pump driven by said input element, a turbine hydraulically driven by said pump, a clutch connecting said turbine to said output element including first clutch means on said turbine and second clutch means drivingly connected to said output element, said first and second clutch means being formed and located adjacent each other to provide a clutch operating expansible chamber motor between said first and second clutch means, friction clutch surfaces on said first and second clutch means adjacent the outer perimeter operative to close said operating chamber when the clutch is engaged and to open said clutch chamber when the clutch is disengaged to permit limited exhaust from said chamber between said surfaces, one of said clutch means being axially movable to engage and disengage said clutch, means to supply fluid under a higher pressure to said expansible chamber motor to disengage said clutch and replace fluid lost through said limited exhaust, and to discontinue the supply of fluid to said clutch chamber for engagement of said clutch by the operating fluid in said rotatable housing, pump means on one of said clutch means to exhaust fluid at the outer periphery between said friction surfaces when the supply of fluid to said clutch operating chamber is discontinued to aid engagement of said clutch.

31. In a transmission; a stationary transmission housing; an input shaft, an output shaft; an input sleeve shaft coaxially located with respect to said output shaft between the ends of said output shaft; means connecting said input shaft to said input sleeve shaft; a torque converter housing rotatably mounted coaxially with said output shaft at one end of said input sleeve shaft and driven by said input sleeve shaft; a torque converter located within said rotary housing and having a pump driven by said rotary housing, a first turbine, a second turbine, and a one-way rotatable stator; a reduction planetary gear set located at an end of said input sleeve shaft and a reverse planetary gear set located at the end opposite said one end of said input sleeve shaft; each gear set being coaxial with said output shaft and each having a carrier member having pinions meshing with a sun gear member and a ring gear member; means operably connecting said first turbine to said output shaft including said reduction planetary gear set, first drive means connecting said first turbine to a first of said members of said reduction gear set, second drive means connecting a second member of said reduction gear set to a first member of said reverse gear set, one of said drive means being a connecting sleeve shaft located coaxially between said output shaft and input sleeve shaft, a one-way drive device and a forward brake for preventing reverse rotation of said second member of said reduction gear set and the third member of said reduction gear being connected to said output shaft; means operably connecting said second turbine directly to said output shaft; a second member of said reverse gear being connected to said output shaft; and a reverse brake for holding the third member of said reverse gear set.

32. The invention defined in claim 31 and said means operably connecting said second turbine to said output shaft being a clutch providing a one-to-one ratio drive.

33. The invention defined in claim 31 and said means operably connecting said second turbine to said output shaft being a multiple ratio gear unit, and means to selectively establish one and another ratio drive through said multiple ratio gear unit.

34. The invention defined in claim 31 and said means operably connecting said second turbine to said output shaft being a torque multiplying gear drive and means to establish and disestablish drive through said torque multiplying gear drive.

35. In a transmission; a stationary transmission housing; an input shaft; an output shaft; an input sleeve shaft coaxially located with respect to said output shaft between the ends of said output shaft; means connecting said input shaft to said input sleeve shaft; a torque converter housing rotatably mounted coaxially with said output shaft at one end of said input sleeve shaft and driven by said input sleeve shaft; a torque converter located within said rotary housing and having a pump driven by said rotary housing, a first turbine, a second turbine, and a one-way rotatable stator; a reduction planetary gear set located at an end of said input sleeve shaft and a reverse planetary gear set located at the end opposite said one end of said input sleeve shaft and each gear set being coaxial with said output shaft and each having a carrier member having pinions meshing with a sun gear member and a ring gear member; means operably connecting said first turbine to said output shaft including said reduction planetary gear set, first drive means operably connecting said first turbine to a first of said members of said reduction gear set, second drive means operably connecting a second member of said reduction gear set to a first member of said reverse gear set, one of said drive means including a connecting sleeve shaft located coaxially between said output shaft and input sleeve shaft, a one-way drive device and a forward brake connected to said second drive means for preventing reverse rotation of said second member of said reduction gear set and the third member of said reduction gear set being connected to said output shaft; means operably connecting said second turbine to said output shaft; drive clutch means for connecting said input shaft through said reduction gear set to said output shaft; a second member of said reverse gear set being connected to said output shaft; and a reverse brake for holding the third member of said reverse gear set.

36. The invention defined in claim 35 and said drive clutch means and a fluid motor operatively connected to said drive clutch means being located in said torque converter housing, means to supply fluid under pressure to said fluid motor to expand said fluid motor to engage said drive clutch means, means to supply fluid under pressure to said torque converter housing to fill the housing, and said fluid motor being acted on by said fluid in said housing to contract said motor and disengage said drive clutch means.

37. The invention defined in claim 35 and said drive clutch means being connected to said third member of said reduction gear set.

38. The invention defined in claim 35 and said drive clutch means being connected to said second member of said reduction gear set.

39. The invention defined in claim 35 and said means connecting said second turbine to said output shaft including a clutch providing a one-to-one ratio.

40. The invention defined in claim 35 and said means operably connecting said second turbine to said output shaft including a two ratio drive gearing, and means to selectively establish a one or the other ratio drive.

41. In a transmission; a stationary transmission housing; an input shaft, an output shaft; an input sleeve shaft coaxially located with respect to said output shaft between the ends of said output shaft; means connecting said input shaft to said input sleeve shaft; a torque converter housing rotatably mounted coaxially with said output shaft at one end of said input sleeve shaft and driven by said input sleeve shaft; a torque converter located within said rotary housing and having a pump driven by said rotary housing, a first turbine, a second turbine, and a one-way rotatable stator; a reduction planetary gear set located at an end of said input sleeve shaft and a reverse planetary gear set located at the end opposite said one end of said input sleeve shaft and each gear set being coaxial with said output shaft and having a carrier member having pinions meshing with a sun gear member and a ring gear member; means operatively connecting said first turbine to said output shaft including said reduction planetary gear set, first drive means connecting said first turbine to said sun gear member of said reduction gear set, second drive means connecting said ring gear member of said reduction gear set to said sun gear member of said reverse gear set, one of said drive means including a connecting sleeve shaft located coaxially between said output shaft and input sleeve shaft, a one-way drive device and a forward brake connected to said second drive means for preventing reverse rotation of said ring gear of said reduction gear set and said carrier member of said reduction gear set being connected to said output shaft; a neutral clutch operatively connecting said second turbine to said output shaft located within said torque converter housing; drive clutch means for connecting said input shaft through said reduction gear set to said output shaft; said carrier member of said reverse gear set being connected to said output shaft; and a reverse brake for holding the said ring gear member of said reverse gear set.

42. The invention defined in claim 41, said drive clutch means being connected to said ring gear member of said reduction gear set.

43. The invention defined in claim 41, said drive clutch means being connected to said carrier member of said reduction gear set.

44. The invention defined in claim 41 and said first drive means including a split torque gear set connecting said first turbine and said torque converter housing with a split torque drive to said sun gear member of said reduction gear set.

45. The invention defined in claim 41, a ratio gear drive in said first drive means to provide a reduction gear drive between said first turbine and said sun gear, and means to disconnect said ratio gear drive.

46. The invention defined in claim 41, a ratio gear drive in said first drive means to provide a reduction gear drive and a direct drive, and means to selectively engage said drives and to disable both drives between said first turbine and said sun gear.

47. The invention defined in claim 41, said first drive means including said connecting sleeve shaft.

48. The invention defined in claim 41, said second drive means including said connecting sleeve shaft.

49. In a transmission; a stationary transmission housing; an input shaft; an output shaft; an input sleeve shaft coaxially located with respect to said output shaft between the ends of said output shaft; means connecting said input shaft to said input sleeve shaft; a torque converter housing rotatably mounted coaxially with said output shaft at one end of said input sleeve shaft and driven by said input sleeve shaft; a torque converter located within said rotary housing and having a pump driven by said rotary housing, a first turbine, a second turbine, and a one-way rotatable stator; a reduction planetary gear set located within said torque converter housing and a reverse planetary gear set located at the other end of said input sleeve shaft; each of said planetary gear sets being coaxial with said output shaft and having a carrier member having pinions meshing with a sun gear member and a ring gear member; drive means operably connecting said first turbine to the sun gear member of said reduction gear set; means operatively connecting said second turbine to said output shaft located within said torque converter housing; a direct drive clutch located within said torque converter housing connecting said torque converter housing to said carrier member of said reduction gear set; said carrier member of said reduction gear set being connected to said output shaft; a connecting sleeve shaft located coaxially between said output shaft and input sleeve shaft connecting said ring gear member of said reduction gear set to said sun gear member of said reverse gear set; a one-way drive device and a forward brake for preventing reverse rotation of said connecting sleeve shaft; said carrier member of said reverse gear set being connected to said output shaft; and a reverse brake for holding the said ring gear member of said reverse gear set.

50. The invention defined in claim 49 and said drive means connecting said first turbine to said sun gear member of said reduction gear set including a split torque gear set connecting said input shaft and first turbine to said sun gear member to provide a split torque drive to said sun gear member.

51. The invention defined in claim 49 and said means connecting said second turbine to said output shaft being a clutch providing a one-to-one ratio drive connection.

52. The invention defined in claim 49 and said means operatively connecting said second turbine to said output shaft being a torque multiplying gear set, and brake means to selectively establish and disestablish drive through said torque multiplying gear set.

53. The invention defined in claim 49 and said means operatively connecting said second turbine to said output shaft being a torque multiplying gear set providing two ratios, and means to selectively establish one and the other ratio.

54. In a transmission; an input shaft; an output shaft; a torque converter having a pump driven by said input shaft, a first turbine, a second turbine, and a stator; fluid operated forward drive means connecting said first turbine to said output shaft; fluid operated reverse drive means operatively associated in the drive connection from said first turbine to said output shaft; second turbine drive means biased to an engaged position and responsive to fluid pressure for disengagement selectively operatively connecting said second turbine to said output shaft; a source of fluid under pressure; a reverse supply line; a first shift valve having a first position connecting said reverse supply line to said reverse drive means and said second turbine clutch to exhaust, and a second position connecting said reverse supply line to said second turbine drive means and said reverse drive means to exhaust; a second shift valve having a first position connecting said source to said forward drive means and said reverse supply line to exhaust, and a second position connecting said source to said reverse supply line and said forward drive means to exhaust; control means in neutral position positioning said first and second shift valves in said second position to provide a positive neutral, and in a reverse position positioning said first shift valve in said first position and said second shift valve in said second position to engage said reverse drive means and said second turbine drive means for reverse drive, and in a forward position placing both said first and second valves in said first position to engage said forward drive means and second turbine drive means for torque converter drive.

55. The invention defined in claim 54 and a fluid operated direct drive clutch operated by fluid pressure to engage and disengage a direct drive between said input shaft and said output shaft, a third shift valve responsive to transmission speed operative to connect said source to said direct drive clutch and to exhaust said direct drive clutch to establish and disestablish direct drive to establish direct drive above a predetermined speed, and manual controlled means operative to move said first shift valve to said second position to move said third shift valve to the position to exhaust said direct drive clutch to disengage said direct drive clutch.

56. In a transmission; an input shaft; an output shaft, a torque converter having a pump driven by said input shaft, a first turbine, a second turbine, and a stator; reduction gear means operatively connecting said first turbine to said output shaft; fluid actuated forward drive means operative in response to fluid pressure to establish drive through said reduction gear means; reverse gear means operatively associated in the drive connection from said first turbine through said reduction gear means to said output shaft; fluid operated reverse drive means operatively connected to said reverse gearing to establish reverse drive between said first turbine and output shaft in response to fluid pressure; a second turbine clutch biased to an engaged position and responsive to fluid pressure for disengagement for selectively connecting said second turbine to said output shaft; a source of fluid under pressure; a reverse supply line; a first shift valve having a first position connecting said reverse supply line to said reverse drive means and said second turbine clutch to exhaust, and a second position connecting said reverse supply line to said second turbine clutch and said reverse drive means to exhaust; a second shift valve having a first position connecting said source to said forward drive means and said reverse supply line to exhaust, and a second position connecting said source to said reverse supply line and said forward drive means to exhaust; control means in neutral position positioning said first and second shift valves in said second position to provide a positive neutral, and in a reverse position positioning said first shift valve in said first position and said second shift valve in said second position to engage said reverse drive means and said second turbine clutch for reverse drive, and in a forward position placing both said first and second valves in said first position to engage said forward drive means and second turbine clutch for torque converter drive.

57. In a transmission; an input shaft; an output shaft, a torque converter having a pump driven by said input shaft, a first turbine, a second turbine, and a stator; reduction gear means operatively connecting said first turbine to said output shaft; fluid actuated forward drive means operative in response to fluid pressure to establish drive through said reduction gear means; reverse gear means operatively associated in the drive connection from said first turbine through said reduction gear means to said output shaft; fluid operated reverse drive means operatively connected to said reverse gearing to establish reverse drive between said first turbine and output shaft in response to fluid pressure; a second turbine clutch biased to an engaged position and responsive to fluid pressure for disengagement for selectively connecting said second turbine to said output shaft; a direct drive clutch operative in response to fluid pressure to connect said input shaft to said output shaft; a source of fluid under pressure; a reverse supply line; a first shift valve having a first position connecting said reverse supply line to said reverse drive means and said second turbine clutch to exhaust, and a second position connecting said reverse supply line to said second turbine clutch and said reverse drive means to exhaust; a second shift valve having a first position connecting said source to said forward drive means and said reverse supply line to exhaust, and a second position connecting said source to said reverse supply line and said forward drive means to exhaust; control means in neutral position positioning said first and second shift valves in said second position to provide a positive neutral, and in a reverse position positioning said first shift valve in said first position and said second shift valve in said second position to engage said reverse drive means and said second turbine clutch for reverse drive, and in a forward position placing both said first and second valves in said first position to engage said forward drive means and second turbine clutch for torque converter drive; a third shift valve responsive to transmission speed operative to connect said source to said direct drive clutch to establish direct drive; and manual controlled means operative to move said first shift valve to said second position to move said third shift valve to the inoperative position to exhaust said direct drive clutch to disengage said direct drive clutch.

58. In a transmission; an input shaft; an output shaft; a fluid drive having an operating chamber and located within said operating chamber, a pump driven by said input shaft and a turbine, a clutch located in said chamber and biased to a disengaged position by fluid under pressure in said chamber and responsive to fluid pressure for engagement connecting said turbine to said output shaft; a source of fluid under high pressure; first fluid drive supply means to normally supply fluid from said source to said chamber under a low pressure, second fluid drive supply means to supply additional fluid to said chamber, control means in neutral position to connect said second fluid drive supply means to said chamber to more positively disengage said clutch, and in drive position disconnecting said second fluid drive supply means from said chamber to reduce the disengaging biasing force on said clutch and to connect said source to said clutch to engage said clutch.

59. In a transmission; an input shaft; an output shaft; a torque converter having an operating chamber and located within said operating chamber, a pump driven by said input shaft, a first turbine, a second turbine, and a fluid actuated forward reduction drive means operatively connecting said first turbine to said output shaft operated by fluid pressure to establish and disestablish drive; fluid operated reverse drive means operated by fluid pressure to establish and disestablish reverse drive between said first turbine and output shaft; a second turbine clutch located in said chamber and biased to a disengaged position by fluid under pressure in said chamber and responsive to fluid pressure for engagement selectively connecting said second turbine to said output shaft; a source of fluid under high pressure; first converter supply means to normally supply fluid from said source to said chamber under a low pressure, second converter supply means to supply additional fluid to said chamber, control means in neutral position providing said second converter supply to said chamber to more positively disengage said second turbine clutch for a positive neutral, and in a reverse position controlling the supply of fluid from said source to engage said reverse drive means and disengaging said second turbine clutch for reverse drive, and in a forward position controlling the supply of fluid from said source to engage said forward drive means and second turbine clutch for torque converter drive.

60. In a transmission; an input shaft; an output shaft; a torque converter having an operating chamber and located within said operating chamber, a pump driven by said input shaft, a first turbine, a second turbine, and a stator; fluid actuated forward reduction drive means operatively connecting said first turbine to said output shaft operative in response to fluid pressure to establish drive; fluid operated reverse drive means including gearing operative to establish reverse drive between said first turbine and output shaft in response to fluid pressure; a second turbine clutch located in said chamber and biased to a disengaged position by fluid under pressure in said chamber and responsive to fluid pressure for engagement selectively connecting said second turbine to said output shaft; a source of fluid under high pressure; first converter supply means to normally supply fluid from said source to said chamber under a low pressure, second converter supply means to supply additional fluid to said chamber, a reverse supply line; a first shift valve having a first position connecting said reverse supply line to said reverse drive means, and said second converter supply means to exhaust, and a second position connecting said reverse supply line to said second converter supply means, and said reverse drive means to exhaust; a second shift valve having a first position connecting said source to said forward drive means and second turbine clutch means and connecting said reverse supply line to exhaust and a second position connecting said source to said reverse supply line and said forward drive means and second turbine clutch means to exhaust, control means in neutral position positioning said first and second shift valves in said second position to provide said second converter supply to more positively disengage said second turbine clutch means for a positive neutral, and in a reverse position positioning said first shift valve in said first position and said second shift valve in said second position to engage said reverse drive means and disengage said second turbine clutch for reverse drive, and in a forward position placing both said first and second valves in said first position to engage said forward drive means and second turbine clutch for torque converter drive.

61. In a transmission; an input shaft; an output shaft; a torque converter having an operating chamber and located within said operating chamber, a pump driven by said input shaft, a first turbine, a second turbine, and a stator; fluid actuated forward reduction drive means operatively connecting said first turbine to said output shaft operative in response to fluid pressure to establish reduction drive; fluid operated reverse drive means including gearing operative to establish reverse drive between said first turbine and output shaft in response to fluid pressure; a second turbine clutch means located in said chamber and biased to a disengaged position by fluid under pressure in said chamber and responsive to fluid pressure for engagement selectively connecting said second turbine to said output shaft; a direct drive clutch located in said chamber, biased to a disengaged position by fluid under pressure in said chamber and operative in response to fluid pressure to connect said input shaft to said output shaft; a source of fluid under high pressure; first converter supply means to normally supply fluid from said source to said chamber at a low pressure, second converter supply means to supply additional fluid to said chamber, a reverse supply line, a signal line; a first shift valve having a first position connecting said reverse supply line to said reverse drive means, said second converter supply means to exhaust, and said signal line to exhaust and a second position connecting said reverse supply line to said second converter supply means, said reverse drive means to exhaust, and said source to said signal line; a second shift valve having a first position connecting said source to said forward drive means and second turbine clutch means and connecting said reverse supply line to exhaust and a second position connecting said source to said reverse supply line and said forward drive means and second turbine clutch means to exhaust, control means in neutral position positioning said first and second shift valves in said second position to provide said second converter supply to more positively disengage said second turbine clutch means and said direct drive clutch for a positive neutral, and in a reverse position positioning said first shift valve in said first position and said second shift valve in said second position to engage said reverse drive means and disengage said second turbine clutch means and forward drive means, and in a forward position placing both said first and second valves in said first position to engage said forward drive means and second turbine clutch means for torque converter drive, third shift valve means responsive to transmission speed normally operative at a predetermined speed and in response to pressure in said signal line responsive to a higher speed to connect said source to said direct drive clutch to establish direct drive, and manual controlled means operative to move said first shift valve to said second position to supply fluid to said signal line to condition said third shift valve to shift at said higher speed.

62. In a transmission; a housing; input means; output means; a torque converter having a pump driven by said input means, a first turbine, a second turbine and a stator connected to said housing to provide reaction; a planetary gear set having a carrier member having planetary pinions meshing with a ring gear member and a sun gear member; a split torque gear means having a pair of input elements and an output element for combining torque from said input elements to said output element; one input element being connected to said input means and the other being connected to said first turbine; said output element being connected to one member of said planetary gear set; means for holding another member of said planetary gear set; drive means connecting said second turbine and the third member of said planetary gear set to said output means.

63. In a transmission; a housing; input means; output means; a torque converter having a pump driven by said input means, a first turbine, a second turbine and a stator connected to said housing to provide reaction; a planetary gear set having a carrier member having planetary pinions meshing with a ring gear member and a sleeve sun gear member; shaft means extending through said sleeve sun gear member and connected to drive said output means; first drive means drive connecting said first turbine directly to a first of said members; brake means to hold a second member; second drive means drive connecting said second turbine to said shaft means between said torque converter and gear set; and third drive means drive connecting the third member on the side of said gear set remote from said torque converter to said shaft means.

64. The invention defined in claim 63 and said third member being said carrier.

65. The invention defined in claim 63 and said first, second and third member being respectively, said sun gear member, ring gear member and carrier member.

66. The invention defined in claim 65 and said first drive means including torque multiplying means.

67. The invention defined in claim 65 and said second drive means including torque multiplying means.

68. In a transmission; a stationary housing; input means; output means; a torque converter having a pump driven by said input means, a first turbine, a second turbine and a stator; means connecting said stator to said housing to limit rotation in one direction to provide a reaction; a reduction planetary gear set having a carrier member with planetary pinions meshing with a sun gear member and a ring gear member; first drive connecting means for directly connecting said first turbine to a first member of said reduction gear set; second drive connecting means for directly connecting said second turbine to said output means; a second member being directly connected to said output means; brake means to prevent reverse rotation of a third member of said reduction gear set engaged for one drive; and a drive clutch directly connecting said input means in shunt relation to one of said members of said reduction gear set.

69. The invention defined in claim 68 and said first, second and third members being respectively said sun gear member, said carrier member and said ring gear member.

70. The invention defined in claim 69 and said drive clutch being connected to one of said carrier and ring gear members.

References Cited by the Examiner

UNITED STATES PATENTS

| | | | |
|---|---|---|---|
| 2,350,810 | 6/1944 | Pentz | 74—677 |
| 2,381,772 | 8/1945 | Pentz | 74—677 |
| 2,855,803 | 10/1958 | Knowles | 74—677 |
| 2,899,844 | 8/1959 | Hattan | 74—688 |
| 3,009,369 | 11/1961 | Flinn | 74—677 |
| 3,030,824 | 4/1962 | Moore | 74—677 |
| 3,051,017 | 8/1962 | Flinn | 74—677 |
| 3,063,308 | 11/1962 | Wayman | 74—677 |
| 3,150,541 | 9/1964 | Flinn | 74—677 |

DAVID J. WILLIAMOWSKY, *Primary Examiner.*

THOMAS C. PERRY, *Examiner.*